United States Patent
Niechcial et al.

(10) Patent No.: US 12,264,522 B2
(45) Date of Patent: Apr. 1, 2025

(54) HATCH OPERATING MECHANISM

(71) Applicant: Volvo Bus Corporation, Gothenburg (SE)

(72) Inventors: Tomasz Niechcial, Wroclaw (PL); Damian Prukacz, Wroclaw (PL)

(73) Assignee: Volvo Bus Corporation, Gothenburg (SE)

( * ) Notice: Subject to any disclaimer, the term of this patent is extended or adjusted under 35 U.S.C. 154(b) by 731 days.

(21) Appl. No.: 16/763,916

(22) PCT Filed: Nov. 17, 2017

(86) PCT No.: PCT/EP2017/079617
§ 371 (c)(1),
(2) Date: May 13, 2020

(87) PCT Pub. No.: WO2019/096406
PCT Pub. Date: May 23, 2019

(65) Prior Publication Data
US 2021/0172226 A1 Jun. 10, 2021

(51) Int. Cl.
*E05D 15/20* (2006.01)
*B60J 5/04* (2006.01)
*E05D 15/10* (2006.01)

(52) U.S. Cl.
CPC ............ *E05D 15/20* (2013.01); *B60J 5/0473* (2013.01); *B60J 5/0491* (2013.01);
(Continued)

(58) Field of Classification Search
CPC ....... E05D 15/42; E05D 15/425; E05D 15/20; E05D 15/1002; B60J 5/0497
See application file for complete search history.

(56) References Cited

U.S. PATENT DOCUMENTS 4,433,505 A * 2/1984 Viner ..................... E05F 15/53
49/110
4,655,144 A * 4/1987 Frech .................... E05F 15/565
105/341
(Continued)

FOREIGN PATENT DOCUMENTS

CN 102481828 A 5/2012
CN 105189901 A 12/2015
(Continued)

OTHER PUBLICATIONS

International Search Report and Written Opinion for International Patent Application No. PCT/EP2017/079617, mailed Jun. 28, 2018, 8 pages.
(Continued)

*Primary Examiner* — Gregory J Strimbu
(74) *Attorney, Agent, or Firm* — Withrow & Terranova, PLLC

(57) ABSTRACT

A hatch operating mechanism is arranged to control opening and closing movements of a hatch covering an opening in a vehicle. The mechanism comprises a first arm and a second arm each having a first end and a second end, wherein each arm is rotatably attached to the vehicle at the first end and rotatably attached to the hatch at the second end. First and second connecting elements extend between and are displaceable relative to a pair of spaced apart, parallel guides fixed to the hatch, wherein the second ends of the arms are rotatably attached to the respective connecting elements. The first arm rotates in a first direction over a first arcuate path, and the second arm simultaneously rotates in an opposing second direction over a second arcuate path; and the first and second connecting elements are configured for reciprocating movement along the guides during rotation of the arms.

17 Claims, 13 Drawing Sheets

(52) U.S. Cl.
CPC ......... *E05D 15/1002* (2013.01); *B60J 5/0497* (2013.01); *E05Y 2201/624* (2013.01); *E05Y 2201/684* (2013.01); *E05Y 2900/506* (2013.01)

(56) References Cited

U.S. PATENT DOCUMENTS

| | | | | |
|---|---|---|---|---|
| 6,030,024 | A * | 2/2000 | Schmidhuber | B60J 5/0497 296/146.12 |
| 10,384,519 | B1 * | 8/2019 | Brown | B60J 5/047 |
| 2005/0146159 | A1 * | 7/2005 | Shen | E05D 15/34 296/155 |
| 2011/0198884 | A1 | 8/2011 | Gad Elkariem | |
| 2014/0157674 | A1 * | 6/2014 | Song | B60J 5/0491 49/340 |
| 2016/0123060 | A1 * | 5/2016 | Choi | E05F 15/614 49/254 |

FOREIGN PATENT DOCUMENTS

| | | |
|---|---|---|
| DE | 1884186 U | 12/1963 |
| DE | 1929013 A1 | 12/1970 |
| DE | 202011110233 U1 | 3/2013 |

OTHER PUBLICATIONS

First Office Action for Chinese Patent Application No. 201780096826.4, mailed Feb. 20, 2023, 8 pages.

* cited by examiner

HATCH OPERATING MECHANISM

This application is a 35 USC 371 national phase filing of International Application No. PCT/EP2017/079617, filed Nov. 17, 2017, the disclosure of which is incorporated herein by reference in its entirety.

TECHNICAL FIELD

The invention relates to a hatch operating mechanism arranged to control opening and closing movements of a hatch covering an opening in a vehicle. The invention further relates to a hatch comprising such a hatch operating mechanism and a vehicle comprising a hatch according to the invention.

The invention is primarily intended for buses but can be applied in heavy-duty vehicles, such as trucks and construction equipment. Although the invention will be described with respect to a bus, the invention is not restricted to this particular vehicle, but may also be used in other vehicles such as wheel loaders, articulated haulers and commercial vehicles in general.

BACKGROUND

Vehicles, in particular relatively large vehicles such as buses, can be provided with a number of external hatches. Such hatches can be opened to allow access to luggage and general storage compartments which are accessed from the outside of the vehicle. A classical arrangement of a vehicle hatch is shown in KR2014076114A, in which the vehicle door is pivotally attached to the side of the vehicle. In order to open a vehicle hatch of this type, it must be lifted and pivoted upwards, which can be quite laborious and also requires a large amount of space as the hatch is swung outwards and upwards to its open position.

An alternative arrangement is shown in DE-GM 1884186, wherein a moving mechanism for a lateral hatch of a bus. The mechanism includes a linkage system attached to the hatch which linkage system is acted on by an actuator for pivoting the hatch away from the luggage compartment opening and into a position parallel with the side of the vehicle. The space required for the linkage mechanism and the actuator in addition to the space required for displacement of the hatch is not inconsiderable and reduces the available space for luggage.

The invention provides an improved hatch operating mechanism for this type of hatch in the external surface of a vehicle and aims to solve the above-mentioned problems.

SUMMARY

An object of the invention is to provide a hatch operating mechanism, which mechanism solves the above-mentioned problems.

According to one aspect of the invention, the object is achieved by means of a hatch operating mechanism arranged to control the opening and closing movements of a hatch covering an opening in a vehicle. The opening is preferably, but not necessarily located in an external surface of the vehicle body. The hatch operating mechanism comprises a first and a second arm, wherein each arm comprises a first end rotatably attached to the vehicle and a second end rotatably attached onto the hatch via a connecting element, and a main extension connecting the first and second ends. The first and second ends of the respective first and second arm extend in opposite directions, giving the arms a general Z-shape. The hatch operating mechanism further comprises a first and a second connecting element, wherein opposite ends of each connecting element are arranged to extend between and cooperate with a pair of spaced apart parallel guide means fixed to the hatch. According to one example, the parallel guide means are preferably, but not necessarily, horizontal and are located along an internal surface of the hatch, facing the interior of the covered compartment. The second ends of the first and second arms are rotatably attached to the first and the second connecting element, respectively, at a suitable position between the opposite ends thereof.

The respective pair of arms and connecting elements is located in mirrored positions relative to a plane of symmetry located at right angles to the main extension of the guide means. The first ends of each first and second arm can comprise integral first shafts arranged in a common plane wherein the first shafts have axes arranged at equal and opposite angles relative the plane of symmetry. According to one example, the common plane can be located at right angles to the plane of symmetry and orthogonal to a plane extending through both the parallel guide means, which plane can coincide with the general plane of the hatch. The second end of each arm can comprise an integral second shaft arranged to be rotatable relative to its connecting element about its own axis and which second shaft has an axis arranged parallel to its corresponding first shaft on the respective arm. Hence, the second shaft has an axis arranged at the same angle to the plane of symmetry as the axis of the first shaft. In this context, the plane of symmetry is located at the mid-point between the first ends of each first arm. The point of intersection of the axes for the first ends or their integral shafts will be located in the plane of symmetry. In the examples below the plane of symmetry is shown at the centre of the corresponding hatch. However, within the scope of the invention it is possible to place the plane of symmetry offset from the centre of the hatch.

In operation, simultaneous rotation of the first and second arms about their first ends or shafts in predetermined, opposite directions relative to each other is arranged to cause a primary displacement of the first and second connecting elements along the guide means from a first position to a second position. In the second position, the arms have been rotated halfway through an arc delimited by the initial position and the final position of the respective arm during the opening of the hatch. The arc encompassing the initial position and the final position is less than 180°. Continued rotation of the first and second arms about their first ends or shafts causes a subsequent secondary displacement of the connecting elements back to the first position, whereby the hatch has been moved from a closed position to an open position. In this way, the connecting elements are arranged to execute a reciprocating movement along the guide means during the rotation of the first and second arms. In order to close the hatch, the first and the second arm are simultaneous rotated in their reverse directions from the final position to the initial position. During the movement of the hatch between the closed and open positions, the hatch is maintained substantially parallel to the side of the vehicle. The hatch itself will perform a swinging movement away from the vehicle. The swinging movement will have a relatively small curvature during the initial opening in order to displace the hatch away from the opening. The curvature will be relatively large as the hatch approaches its fully open position, in order to maintain the hatch adjacent the vehicle side and reduce the space required for opening the hatch. The shape of this variable curvature is determined by the angle of the first shafts and first ends of the respective first arms relative to the plane of symmetry.

By the provision of a hatch operating mechanism which comprises the above-mentioned component parts, the invention achieves the advantage of providing a mechanism that allows the hatch to be displaced in parallel with the side of the vehicle during opening and closing. In order to allow parallel, or sideways, displacement of the hatch, the hatch operating mechanism is operated over an initial, predetermined distance sufficient to move the hatch away from the side of the vehicle and clear of the opening. By releasing a mechanical locking device and/or by operating a drive unit drivingly connected between the connecting element and the guide means, the hatch can be opened sideways in either direction over a limited distance, until one of the connecting elements reaches the end of the guide means.

The hatch operating mechanism according to the invention can be operated manually or be power assisted by means of one or more drive units. A power assisted hatch operating mechanism can comprise at least one primary drive unit arranged to be drivingly connected to the first shafts at the first ends of the respective first and second arms, wherein the at least one primary drive unit is arranged to drive the first shafts in opposite directions relative to each other.

A hatch operating mechanism according to a first example comprises a primary drive unit connected to the vehicle adjacent a central portion of the opening in the side of the vehicle. The drive unit is attached to the vehicle on or near a surface delimiting the compartment adjacent the internal surface of the hatch when the hatch is in its closed position. The drive unit extends a predetermined distance into the compartment, allowing the common plane of the axes of the first shafts of the first and second arms to extend out of the opening parallel to an adjacent edge of the opening. The primary drive unit is drivingly connected to both the first shafts of each first end via a suitable transmission mechanism for simultaneous rotation of the arms in predetermined opposite directions. Alternatively, each first shaft can be driven by a separate motor, wherein both motors are arranged adjacent a central portion of the opening in the side of the vehicle. In a preferred example, the first shaft of each arm is arranged at a predetermined angle $\alpha$ relative to the plane of symmetry. In this case, the angles are arranged to diverge towards the interior of the vehicle. The angle can be selected within the range $0°<\alpha<75°$, depending on the location of the hatch on the vehicle, the type, size and thickness of the hatch and the shape of the opening to be covered.

At relatively low angles, e.g. in the range 1°-5° the axes of the first shafts of the first and second arms will be near parallel. In such cases, rotation of the first and second arms will cause a relatively small outwards displacement before the hatch is lifted upwards parallel to the wall surrounding the opening. This can be achieved if an inner surface of the hatch is located flush with the outer wall surrounding the opening when the hatch is in its closed position. The inner surface of the hatch has an outer edge in contact with an outer surface of the wall surrounding the opening. The inner surface can extend inwards from the outer edge to at least partially overlap the adjacent outer wall surface.

The outwards displacement will then be sufficient to move the hatch out of contact with the outer wall. The first ends of the first and second arms will extend out of the opening, from the drive motor or motors and into the interior of the hatch. The first and second arms, the connecting elements and other components making up the mechanism can be located within an interior space between the main inner and outer surfaces of the hatch. If a seal is required, then a solid seal comprising a natural or synthetic rubber material or a suitable elastic non-compressible polymer material can be used. If the angle is increased, then the initial outward displacement will also increase, allowing a compressible or deformable seal to be used.

As the angles are increased, the initial outward displacement of the hatch will increase correspondingly. Depending on the thickness of the hatch and the shape of the opening, a comparatively larger angle can achieve an initial outward displacement allowing the outer surface of the hatch to be located flush with the outer wall surrounding the opening in its closed position. In its closed position, the hatch would then be arranged in a recess along the edge of the opening. A suitable seal can be arranged along the side edge of the hatch, along the outer edge of the inner surface of the hatch, or in the recess surrounding the opening.

At relatively high angles, e.g. up to 75°, the outward displacement of the hatch will increase correspondingly. Although the hatch will remain parallel to the wall containing the compartment, the distance between the hatch and the outer surface of the wall during opening will increase with increasing angles. Hence, the upper limit for the angle can be restricted by a maximum desired value for the distance between the hatch and the wall during opening, as this distance determines the allowable spacing between adjacent parked vehicles.

A hatch provided with a hatch operating mechanism comprising a single, centrally placed primary drive unit can be arranged to be opened by means of the primary drive unit and the first and second arms only. According to a first alternative example, the hatch operating mechanism is provided with a stabilizing arrangement arranged to prevent sideways displacement of the hatch during the opening and closing operation. The stabilizing device comprises a central sliding member arranged to move between and parallel with the connecting elements adjacent a pair of first ends of the connecting elements during actuation of the hatch. A pair of struts are arranged to extend from pivots on the central sliding member adjacent and equidistant from the first ends of the connecting elements to pivots on a respective second end of each connecting element. The central sliding member is arranged to cooperate with a central guide having an axis intersecting a central position of the guide means in the plane of symmetry through the hatch. During operation of the hatch, the reciprocating displacement of the connecting elements causes the struts to act on the central sliding member, which will perform a corresponding reciprocating movement along the central guide. As the central guide is fixed to the hatch the central sliding member can only move along the axis of the central guide. This prevents the hatch in this first alternative example from moving in a sideways direction while opening or closing the hatch.

A hatch provided with a hatch operating mechanism comprising a single, centrally placed primary drive unit can also be arranged to be opened sideways, at substantially 90° to the main direction of the movement caused by actuation of the first and the second arm. Once the hatch operating mechanism has been operated over an initial, predetermined distance sufficient to move the hatch away from the side of the vehicle and clear of the opening, the primary drive unit can be stopped. In this intermediate position the hatch can be arranged to be displaced sideways, either manually or by means of at least one secondary drive unit. Depending on the design of the hatch operating mechanism a mechanical locking device, that prevents sideways displacement of the hatch during operation of the first and the second arm, can be released to enable sideways movement. The mechanical locking device can be position dependent and/or be operated manually or by any suitable drive means in order to release it to allow sideways displacement of the hatch in a desired direction.

Subsequent manual operation or operation of the secondary drive unit causes a sideways displacement of the hatch parallel to the guide means, at right angles to the initial displacement caused by the primary drive unit. This allows the hatch to be opened sideways in either direction over a limited distance, until one connecting element reaches the end of the guide means. An advantage with this arrangement is that access can be provided to a limited portion of the storage or luggage compartment. This can be useful in cases when it is desired to provide access to a selected portion of the storage compartment, e.g. for security reasons or for weather related reasons, such as a heavy downpour of rain.

As described above, in connection with the first alternative example, the hatch operating mechanism is provided with a stabilizing arrangement arranged to prevent sideways displacement of the hatch during the opening and closing operation. This is also the case for hatches arranged to be opened sideways.

According to a second alternative example, a mechanical locking device is arranged to be position dependent in order to release it to allow sideways displacement of the hatch in a desired direction. The hatch operating mechanism according to the second alternative example is provided with a stabilizing device that also acts as a mechanical locking device. According to this example, the stabilizing device comprises a central rod arranged between and parallel with the connecting elements. A pair of struts are arranged to extend from pivots at a first end of the central rod adjacent one end of the connecting elements to a respective pivot at the opposite end of each connecting element adjacent the second end of the central rod. The central rod can be arranged to cooperate with guides intersecting a central position of each guide means. The central rod and the guides are preferably located in the plane of symmetry through the hatch. Each guide means is interrupted by a gap at the point of intersection, in order to allow the central rod to pass through the guides located in the gaps between the interrupted guide means. During operation, a first end of the central rod is arranged to cooperate with a first guide when the hatch is in its closed position and in its fully open position. A second end of the central rod is arranged to cooperate with a second guide while the hatch is moving between its closed position and its fully open position.

The central rod can further be arranged to be located in an intermediate position between and out of contact with both the first and the second guide. This position is reached when the hatch operating mechanism has been operated over an initial, predetermined distance sufficient to move the hatch clear of the opening. The hatch operating mechanism can be stopped in this intermediate position, in order to allow displacement of the hatch parallel to the guide means. The parallel first and second means will then allow the hatch to slide sideways relative to the connecting elements held in position by the primary drive unit and the first and the second arm. This enables the hatch to be opened sideways without being obstructed by the stabilizing device. In this way the stabilizing device in this example can be used as a position dependent mechanical locking device. The hatch can be opened sideways in either direction over a limited distance, until one connecting element reaches the end of the guide means.

Subsequently, the hatch is returned to the intermediate position, wherein the central rod is indexed with both the first and the second guide. The primary drive unit can then be operated to actuate the first and the second arm in order to displace the hatch towards its open or closed position.

The hatch operating mechanism in this example can be provided with an optional secondary drive unit. The secondary drive unit can be arranged on at least one end of a connecting element and is drivingly connected to an adjacent guide means. The sideways displacement of the hatch can then be controlled by switches adjacent the hatch, by means of a handheld remote, or from a remote location within the vehicle.

According to a third alternative example, a mechanical locking device is arranged to be operated manually or by any suitable drive means in order to release it to allow sideways displacement of the hatch in a desired direction. The hatch operating mechanism according to the third alternative example is provided with a stabilizing device comprising a mechanical locking device mounted on the hatch. The stabilizing device comprises a central sliding member arranged to move between and parallel with the connecting elements adjacent a pair of first ends of the connecting elements during actuation of the hatch. A pair of struts are arranged to extend from a common pivot on the central sliding member adjacent and equidistant from a pair of first ends of the connecting elements to pivots on a respective second end of each connecting element. The central sliding member is arranged to cooperate with a central guide in the locking means, which is mounted to the hatch. The central guide is initially located in a first position with an axis intersecting a central position of the first and second guide means in the plane of symmetry through the hatch. During operation of the hatch using the primary drive unit, the reciprocating displacement of the connecting elements causes the struts to act on the central sliding member, which will perform a corresponding reciprocating movement along the central guide at right angles to the first and second guide means. As the locking means is mounted on the hatch the central sliding member can only move along the axis of the central guide while the hatch is displaced by the first arms. This prevents the hatch in this example from moving in a sideways direction while opening or closing the hatch.

The central guide is rotatable 90° from the first position to a second position about an axis at right angles to the plane of the hatch, in order to release the mechanical locking device. In the second position the axis of the central guide is parallel to the first and second guide means attached to the hatch. Rotation of the central guide is possible when the common pivot of the central sliding member is located coinciding with the axis of rotation of the central guide. The axis of rotation of the central guide coincides with the common pivot on the central sliding member when the hatch operating mechanism has been operated over an initial, predetermined distance sufficient to move the hatch clear of the opening. The hatch operating mechanism is stopped in this intermediate position, in order to allow release of the mechanical locking device and displacement of the hatch parallel to the guide means. In the second position, the central guide is indexed with an additional guide means extending parallel to the first and second guide means along the hatch. The parallel first, second and additional guide means will then allow the hatch to slide sideways relative to the central sliding member and the connecting elements held in position by the primary drive unit and the first arms. This allows the hatch to be opened sideways in either direction over a limited distance, until one connecting element reaches the end of the guide means.

Subsequently, the hatch is returned to the intermediate position, wherein the common pivot of the central sliding member coincides with the axis of rotation of the central guide. The central guide is then rotatable 90° from the second position to the first position to secure the mechanical locking device and prevent sideways movement of the hatch. The primary drive unit can then be operated to actuate the first arms in order to displace the hatch towards its open or closed position.

The hatch operating mechanism in this example can be provided with an optional secondary drive unit. The secondary drive unit can be arranged on at least one end of a connecting element and is drivingly connected to an adjacent guide means. The sideways displacement of the hatch can then be controlled by switches adjacent the hatch, by means of a handheld remote, or from a remote location within the vehicle.

A hatch operating mechanism according to a second embodiment comprises a pair of primary drive units connected to the vehicle along one and the same side of the opening. The primary drive units are mounted with a predetermined spacing, preferably at each end of the side of the opening along a common edge of the hatch. The drive units are attached to the vehicle adjacent the internal surface of the hatch when the hatch is in its closed position. The drive units extend a predetermined distance into the compartment, allowing the common plane of the axes of the first shafts of the first and second arms to extend out of the opening parallel to the common adjacent edge of the opening. Each primary drive unit is drivingly connected to a respective first shaft of the first ends of the respective first and second arms, directly or via a transmission mechanism for simultaneous rotation of the arms in predetermined, opposite directions. In this example, the first shaft at the first end of each first arm is arranged at a predetermined angle $\alpha$ relative to the plane of symmetry. The angle is selected within the range $0°<\alpha<75°$. The selection of suitable angles has been described above. In this case, the angles are arranged to converge towards the interior of the vehicle.

According to a second aspect of the invention, the object is achieved by a vehicle hatch, wherein the hatch comprises a hatch operating mechanism as described above.

According to a further aspect of the invention, the object is achieved by a vehicle, wherein the vehicle comprises a hatch with a hatch operating mechanism as described above. An advantage of a hatch operating mechanism according to the invention is that the hatch can be opened substantially parallel to a side surface of the vehicle in multiple directions, both upwards and sideways. A further advantage is that the mechanism and any optional actuators are relatively compact and does not reduce the available space for luggage. The arrangement maximizes the available space for storage within the compartment and minimizes the space required by the hatch operating mechanism during displacement of the hatch.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
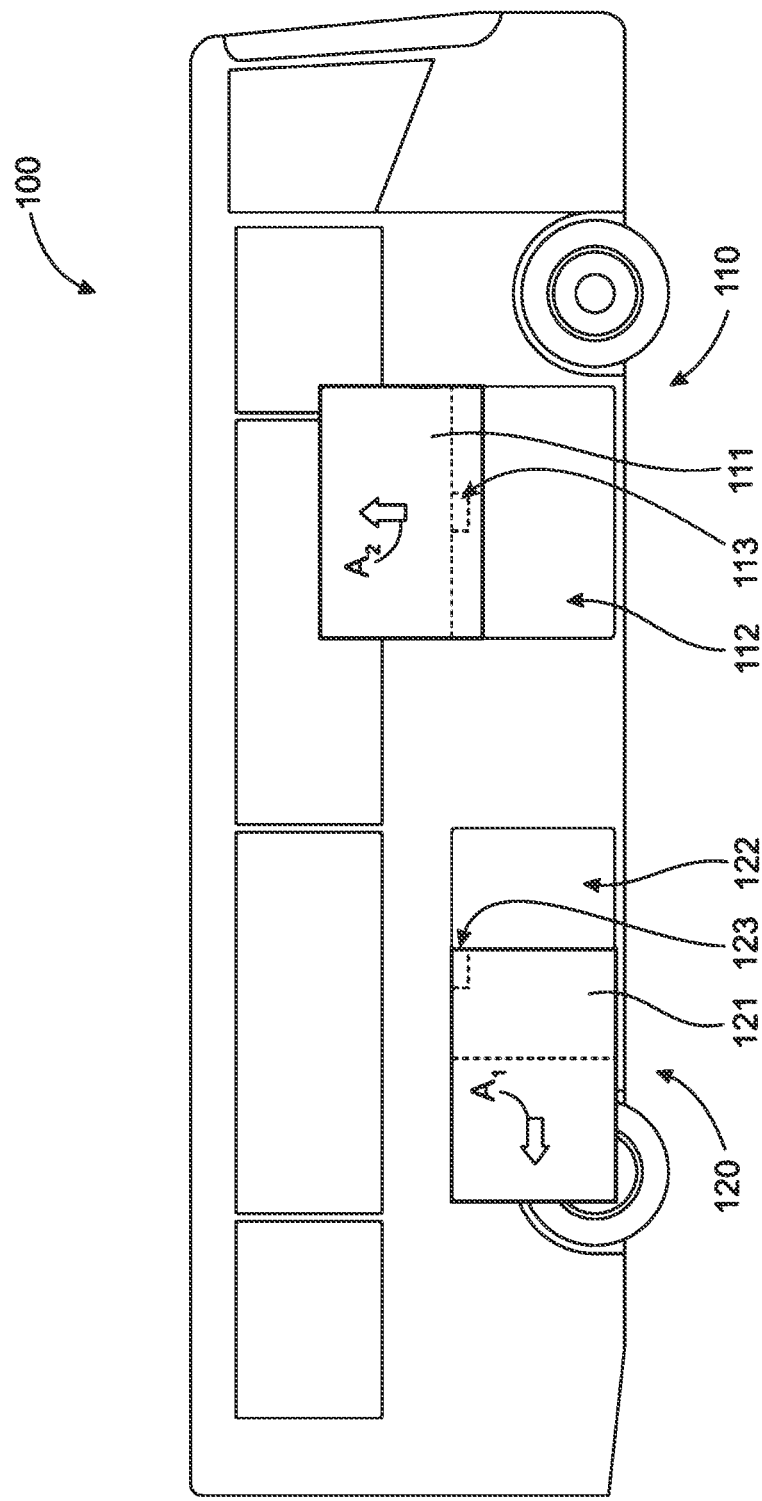
FIG. 1 shows a side view of a vehicle provided with a hatch according to the invention.

FIG. 1 shows a side view of a vehicle 200 provided with a hatch according to the invention. The vehicle 200 in FIG. 1 is exemplified by a bus 100 which is provided with a first and a second storage means 110, 120 for luggage or other cargo to be transported by the bus 100. The first and a second storage means 110, 120 comprise a first and a second hatch 111, 121, respectively, arranged to cover a first and a second luggage compartment 112, 122 when the bus is being driven. In FIG. 1 the first hatch 111 has been displaced upwards as indicated by the arrow $A_2$ and is shown in an open position where the first luggage compartment 112 is fully accessible. The first hatch 111 can be opened and closed manually, or by a primary drive unit 113 mounted onto an upper delimiting surface of the first luggage compartment 112 so that the full width of the compartment 112 can be accessed for loading and unloading. In FIG. 1 the primary drive unit 113 is hidden by the first hatch 111 and is indicated in dashed lines.

FIG. 1 further shows the second hatch 121 displaced sideways as indicated by the arrow $A_1$. The second hatch 121 is shown in a partially open position where the second luggage compartment 122 is partially accessible. A hatch operating mechanism that enables the hatches to be opened both upwards and/or sideways will be described in further detail below.

The first and second storage means 110, 120 are preferably, but not necessarily, identical and are provided with same size hatches, hatch operating mechanisms and drive units.

Figure 2:
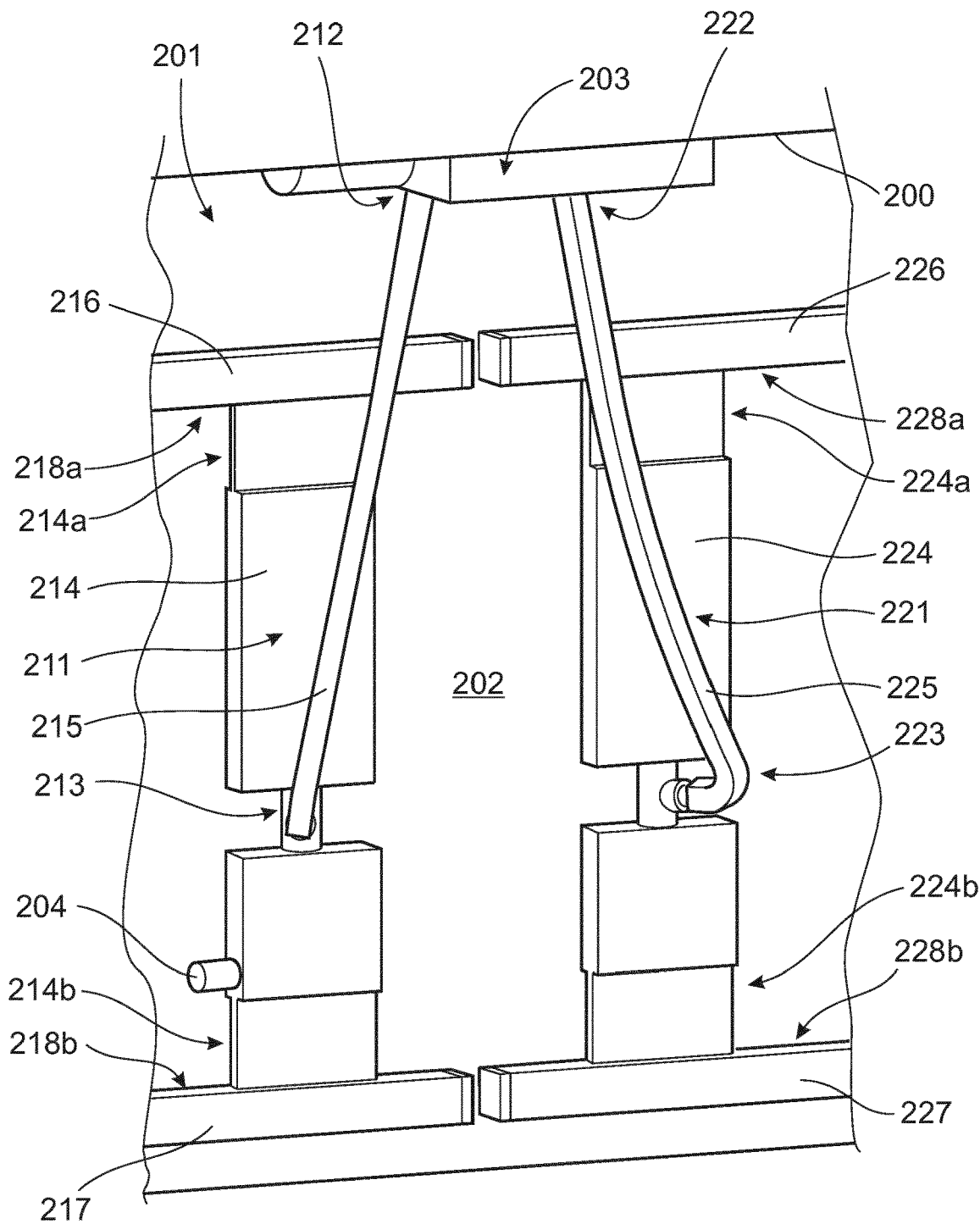
FIG. 2 shows a hatch operating mechanism according to the invention.

FIG. 2 shows a hatch operating mechanism 201 according to the invention. The hatch operating mechanism 201 is arranged to control the opening and closing movements of a hatch 202 for covering an opening in a vehicle 200, as shown in FIG. 1. The mechanism comprises a first and a second arm 211, 221, wherein each arm 211, 221 comprises a first end 212, 222 rotatably attached to a primary drive unit 203 on the vehicle 200. Each arm 211, 221 has a second end 213, 223 rotatably attached to a connecting element 214, 224, and a main extension 215, 225 connecting the first and second ends 212, 222; 213, 223. The first and second ends of the respective first and second arm extend in opposite directions, giving the arms a general Z-shape. In this example, the hatch 202 is provided with hatch operating mechanism comprising a single, centrally placed primary drive unit for rotating the first and second arms 211, 221. The primary drive unit 203 can comprise a suitable motor and a transmission to which the first ends 212, 222 of the arms 211, 221 are connected. Examples of a suitable motor for this purpose can be an electric motor or a fluid driven motor, e.g. a hydraulic or pneumatic motor. The transmission is preferably, but not necessarily, a geared transmission.

The respective first and second connecting elements 214, 224 have opposite ends 214a, 214b; 224a, 224b, wherein the opposite ends each connecting element 214, 224 are arranged to cooperate with a pair of parallel guide means 216, 217; 226, 227 fixed to the hatch 202. The opposite ends 214a, 214b; 224a, 224b of the first and second connecting elements 214, 224 have suitable guide surfaces cooperating with mating guide surfaces 218a, 218b; 228a, 228b on the respective guide means 216, 217; 226, 227. This arrangement allows the first and second connecting elements 214, 224 to be displaced relative to each other along the guide means 216, 217; 226, 227 during opening and closing of the hatch under the action of the first and second arms 211, 221.

The connected first arm 211 and first connecting element 214 and the connected second arm 221 and second connecting element 224 are located in mirrored positions relative to a plane of symmetry (see FIG. 3) at right angles to the parallel guide means 216, 226; 217, 227. The example shows that the first and second arms 211, 221 comprise first ends with integral first shafts (see FIG. 3), where the respective first ends and first shafts have a common axis. The first shafts are arranged to be mirrored in a common plane and have axes arranged at equal and opposite angles relative the plane of symmetry (see FIG. 4; "a" and "P"). The second end of each first and second arm 211, 221 comprises an integral second shaft (see FIG. 3 or 4; "243/244") arranged to be rotatable about its own axis relative to its respective connecting element 214, 224 and which second shaft have an axis arranged parallel to its corresponding first shaft.

In operation, simultaneous rotation of the first and second arms 211, 221 of FIG. 2 in predetermined and opposite directions is arranged to cause a primary displacement of the connecting elements 214, 224 away from each other along the guide means 216, 217; 226, 227 from a first position to a second position. In this second position, the arms 211, have been rotated halfway through an arc delimited by an initial position (see FIG. 7) and a final position of the respective arm 211, 221 during the opening of the hatch 202. Continued rotation of the first and second arms 211, 221 causes a subsequent secondary displacement of the connecting elements 214, 224 from their second positions back to their respective first positions, in order to move the hatch 202 from a closed to an open position. In this way the connecting elements perform a reciprocating movement along the guide means as the arms 211, 221 are rotated through the arc delimited by the initial position and the final position.

A hatch 202 provided with hatch operating mechanism comprising a single, centrally placed primary drive unit 203 can be provided with an optional secondary drive unit 204. The secondary drive unit 204 can be arranged on at least one end 214b of a connecting element 214 and is drivingly connected to the adjacent guide means 217. The secondary drive unit 204 can comprise a suitable motor that may be combined with a transmission means, for displacing the hatch. Examples of a suitable motor for this purpose can be an electric motor or a fluid driven motor, e.g. a hydraulic or pneumatic motor. The motor can drive the hatch directly, via a gear and pinion drive or indirectly via a transmission, such as a geared transmission, a linear motor, a linear telescoping actuator or similar.

During operation, the primary drive unit 203 of the hatch operating mechanism is first operated over an initial, predetermined distance sufficient to move the hatch 202 away from the side of the vehicle and clear of the opening covered by the hatch. When the hatch 202 reaches this intermediate position the primary drive unit 203 is stopped. Subsequent operation of the secondary drive unit 204 causes a sideways displacement of the hatch parallel to the guide means 216, 217; 226, 227, substantially at right angles to the initial displacement caused by the primary drive unit 203. The direction of the sideways movement is selected by selecting an operating direction for the secondary drive unit 204. This allows the hatch to be opened sideways in either direction over a limited distance, until one connecting element 214, 224 reaches the end of the guide means 216, 217; 226, 227. An advantage with this arrangement is that access can be provided to a limited portion of the storage or luggage compartment.

During operation of the hatch 202 between its closed and fully open position using the primary drive unit 203, the secondary drive unit 204 is disconnected or free-wheeling. This allows the connecting elements 214, 224 to execute a reciprocating movement along the guide means 216, 217; 226, 227 during the rotation of the first and second arms 211, 221. Sideways movement is not desired during operation of the primary drive unit 203. This can be prevented by operating the secondary drive unit 204 in response to a position sensing means (not shown) in order to counteract any unintended sideways displacement of the hatch relative to the opening.

Figure 3:
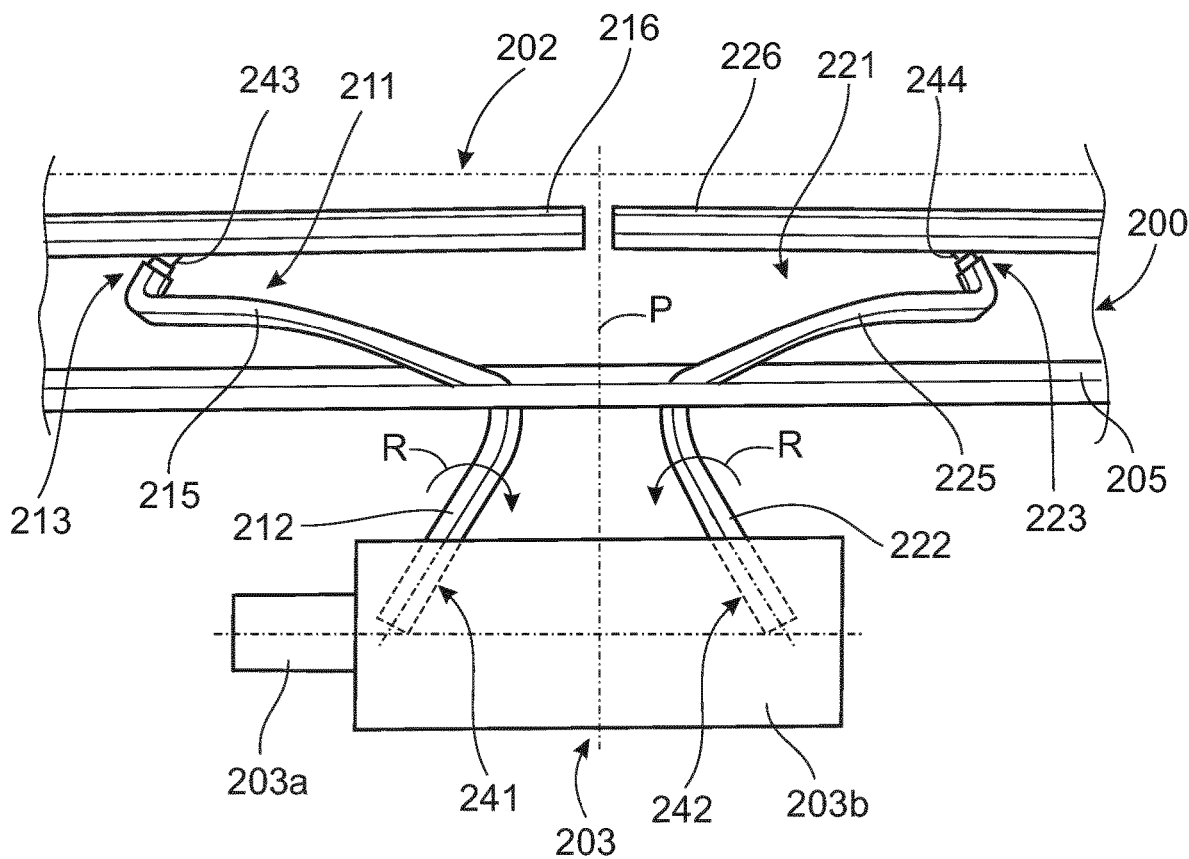
FIG. 3 shows a top plan view of the hatch operating mechanism in FIG. 2.

FIG. 3 shows a top plan view of the hatch operating mechanism in FIG. 2. The reference numbering used in FIG. 2 will be retained. The mechanism shown in FIG. 3 comprises a first and a second arm 211, 221, wherein each arm 211, 221 comprises a first end 212, 222 rotatably attached to the vehicle 200 via a primary drive unit 203. Each arm 211, 221 has a second end 213, 223 rotatably attached to a connecting element 214, 224, and a main extension 215, 225 connecting the first and second ends 212, 222; 213, 223. The first and second ends of the respective first and second arm extend in opposite directions, giving the arms a general Z-shape. The hatch 202 is provided with hatch operating mechanism comprising a single, centrally placed primary drive unit 203 connected to a pair of first shafts 241, 242 for rotating the first and second arms 211, 221. The primary drive unit 203 is mounted adjacent an opening 205 in the side of the vehicle and comprises a suitable motor 203a and a transmission 203b to which the first ends 212, 222 of the arms 211, 221 are connected. The second ends; 213, 223 of the first and second arms 211, 221 are connected to first and second connecting elements (see FIG. 2; "214, 224").

The first arm 211 and the second arm 221 are located in mirrored positions relative to a plane of symmetry P at right angles to parallel guide means 216; 226 (see FIG. 2). The first ends of each first and second arm 211, 221 comprise first shafts 241, 242 arranged in a common plane, which first shafts 241, 242 have axes arranged at equal and opposite angles α relative to the plane of symmetry (see FIG. 4). The second end of each first and second arm 211, 221 comprises a second shaft 243, 244 arranged to be rotatable about its own axis relative to its respective connecting element (not shown; see FIG. 2). Each second shaft 243, 244 has an axis arranged parallel to its corresponding first shaft 241, on the respective first and second arm 211, 221. The length of first ends 212, 222 of the respective arm 211, 221 and the location of the primary drive unit 203 in relation to the opening 205 in the side of the vehicle 200 is selected to allow the first and second arms 211, 221 to swing clear of the edges of the opening 205 and along the side of the vehicle. FIG. 3 shows a pair of arrows R indicating the direction of rotation of the first shafts 241, in opposite direction for opening the hatch 202.

Figure 4:
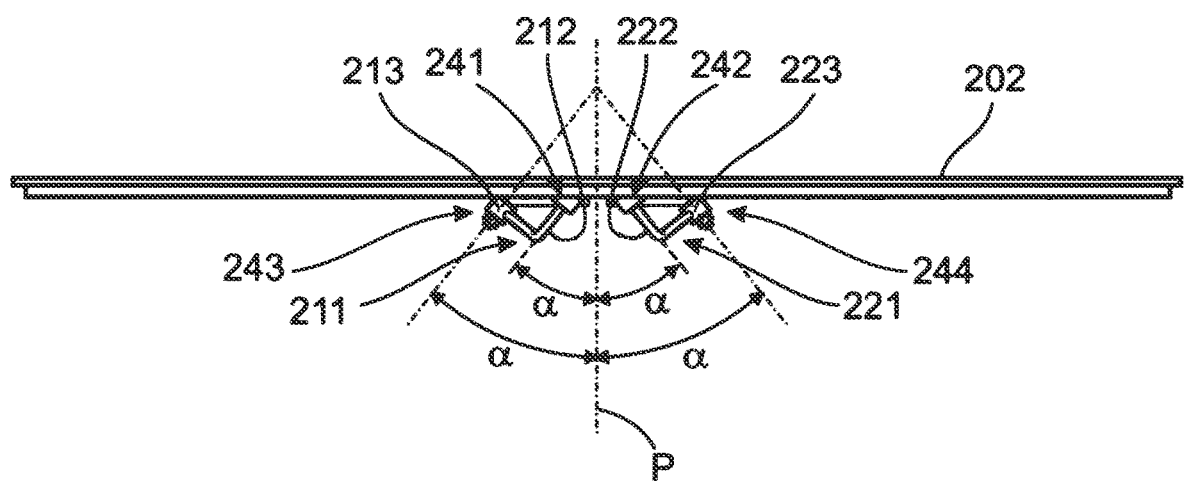
FIG. 4 shows a bottom plan view of a hatch and attached first and the second arm in FIG. 2.

FIG. 4 shows a bottom plan view of a hatch 202 and attached first and second arms 211, 221. The figure shows the first shafts 241, 242 at the first ends 212, 222 of the first and second arms 211, 221, which first shafts 241, 242 have axes arranged at equal and opposite angles α from the plane of symmetry P. Similarly, the respective axes of the second shafts 243, 244 at the second ends 213, 223 of the first and second arms 211, are arranged at equal and opposite angles α from the plane of symmetry P.

Figure 5:
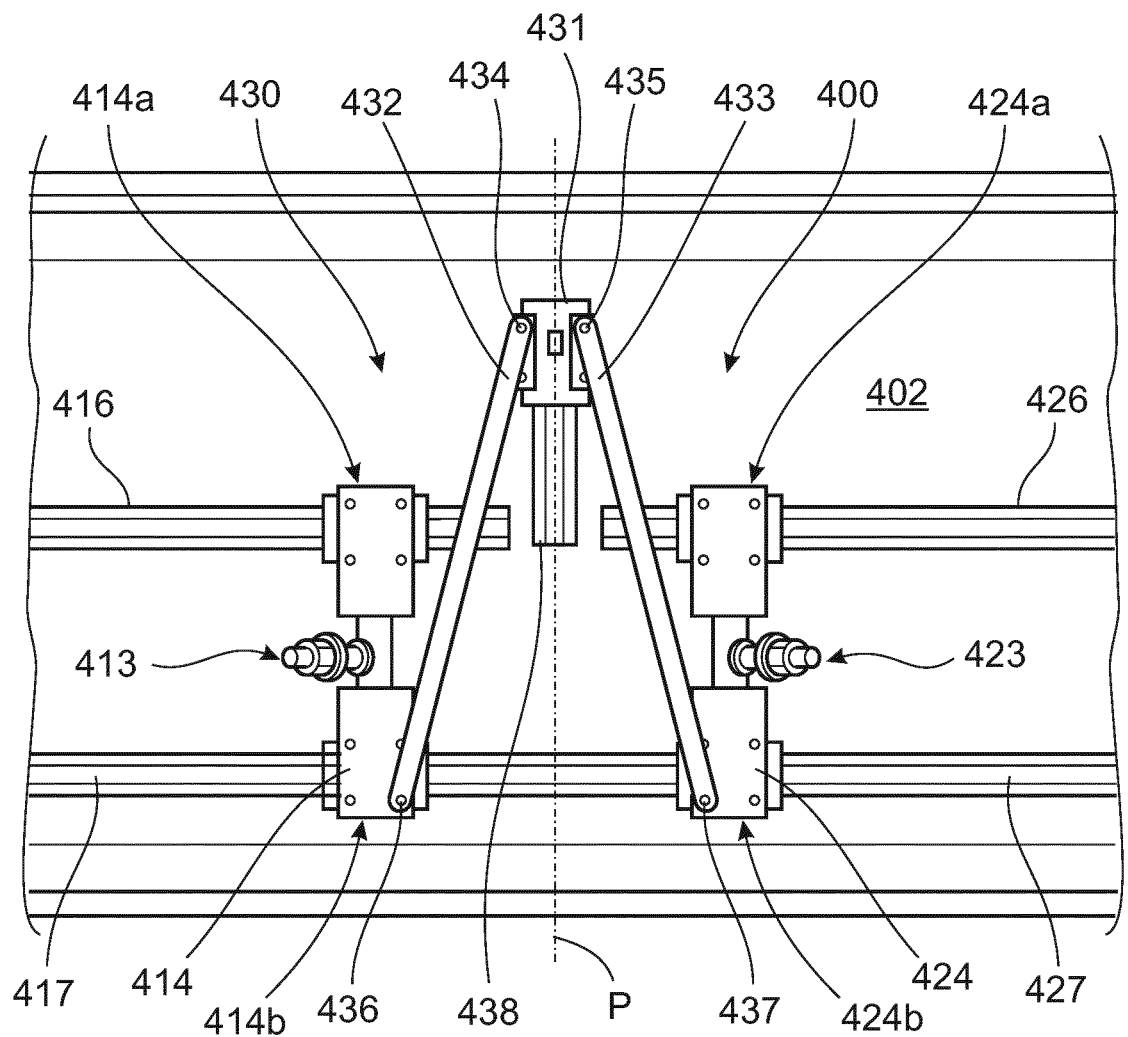
FIG. 5 shows a hatch operating mechanism according to the invention provided with a first alternative stabilizing device

FIG. 5 shows a hatch operating mechanism according to the invention provided with a first alternative stabilizing device 430. A hatch provided with a hatch operating mechanism comprising a single, centrally placed primary drive unit 203 as outlined in FIG. 2 can be arranged to be opened by means of the primary drive unit 203 and the first and second arms 211, 221 as described above.

According to the first alternative example, shown in FIG. 5, the hatch operating mechanism is provided with a stabilizing arrangement 430 arranged to selectively prevent sideways displacement of the hatch 402 during the opening and closing operation. The stabilizing device 430 comprises a central sliding member 431 arranged to move between and parallel with the connecting elements 414, 424 adjacent a pair of first ends 414a, 424a of the connecting elements 414, 424 during actuation of the hatch 402. A pair of struts 432, 433 are arranged to extend from pivots 434, 435 on the central sliding member adjacent and equidistant from the first ends 414a, 424a of the connecting elements 414, 424 to pivots 436, 437 on a respective second end 414b, 424b of each connecting element 414, 424. The central sliding member 431 is arranged to cooperate with a central guide 438 fixed to the hatch 402 and having an axis intersecting a central position of the guide means in the plane of symmetry P through the hatch 402. During operation of the hatch 402, as described in connection with FIG. 2, the reciprocating displacement of the connecting elements 414, 424 along the parallel guide means 416, 426; 417, 427 mounted on the hatch 402 causes the struts 432, 433 to act on the central sliding member 431, which member will perform a corresponding reciprocating movement along the central guide 438. As the central guide 438 is fixed to the hatch 402, the central sliding member 431 can only move along the axis of the central guide 438. This prevents the hatch 402 in this first alternative example from moving in a sideways direction while opening or closing the hatch 402.

Figure 6:
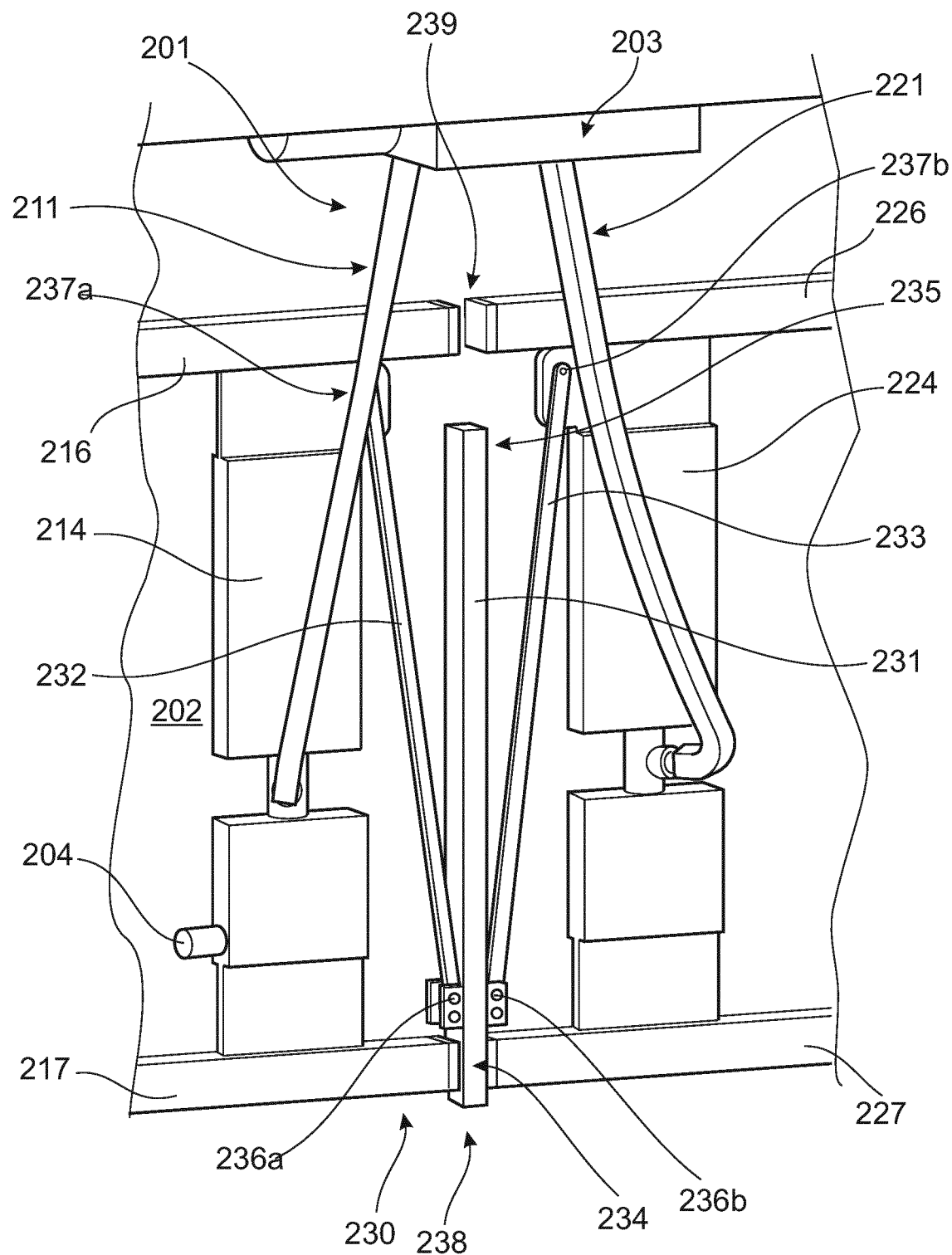
FIG. 6 shows a hatch operating mechanism according to the invention provided with a second alternative stabilizing device according to the invention

FIG. 6 shows a hatch operating mechanism as described in connection with FIG. 2 provided with a second alternative stabilizing device 230. The reference numbering used in FIG. 2 will be retained for this example. The stabilizing device 230 comprises an elongate central rod 231 arranged between and parallel with the connecting elements 214, 224 of the hatch operating mechanism 201. A pair of struts 232, 233 are arranged to extend from a first end 234 of the central rod 231 located adjacent one end of the connecting elements 214, 224 to the respective opposite ends of each connecting element 214, 224 adjacent the second end 235 of the central rod 231. The struts 232, 233 are pivotable in a plane parallel to a plane through the parallel guide means 216, 217; 226, 227. A pair of first pivot joints 236a, 236b allows the struts 232, 233 to be pivoted relative to the central rod 231. A pair of second pivot joints 237a, 237b allows the struts 232, 233 to be pivoted relative to their respective connecting element 214, 224. The first and second ends 234, 235 of the central rod 231 are arranged to cooperate with first and second stabilizing guides 238, 239 intersecting a central position of each guide means 216, 217; 226, 227. During rotation of the first and second arms 211, 221 the central rod is arranged to be displaced along its central axis in the plane of symmetry. The first end 234 of the central rod 231 is arranged to cooperate with the first guide 238 when the hatch 202 is in its closed position and its fully open position, i.e. whenever the first and second arms 211, 221 are in their end positions. The second end 235 of the central rod is arranged to cooperate with the second guide 239 when the hatch 202 is between its closed position and its fully open position. In this example this occurs while the hatch is approximately halfway between the closed and open positions. In this way, the stabilizing central rod 231 will move linearly between the first stabilizing guide 238 and the second stabilizing guide 239 during operation of the primary drive unit 203 to open or close the hatch 202.

In order to allow the hatch 202 to be opened sideways, the primary drive unit 203 is first operated to rotate the first and second arms 211, 221 over an initial, predetermined distance sufficient to move the hatch 202 away from the side of the vehicle and clear of the opening covered by the hatch. The primary drive unit 203 is stopped when the central rod 231 is located in an intermediate position (see FIG. 5) out of contact with both the first and the second stabilizing guides 238, 239, in order to allow displacement of the hatch parallel to the guide means 216, 217; 226, 227 by operation of the secondary drive unit 204.

Figure 7:
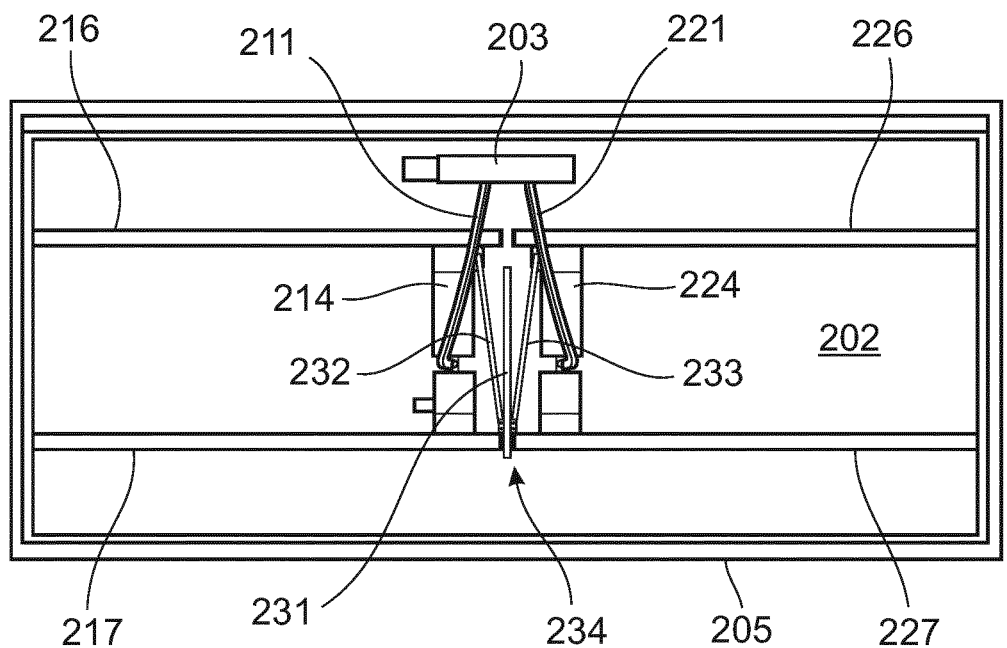
FIG. 7 shows the hatch operating mechanism of FIG. 6 in its initial, closed position.
Figure 8:
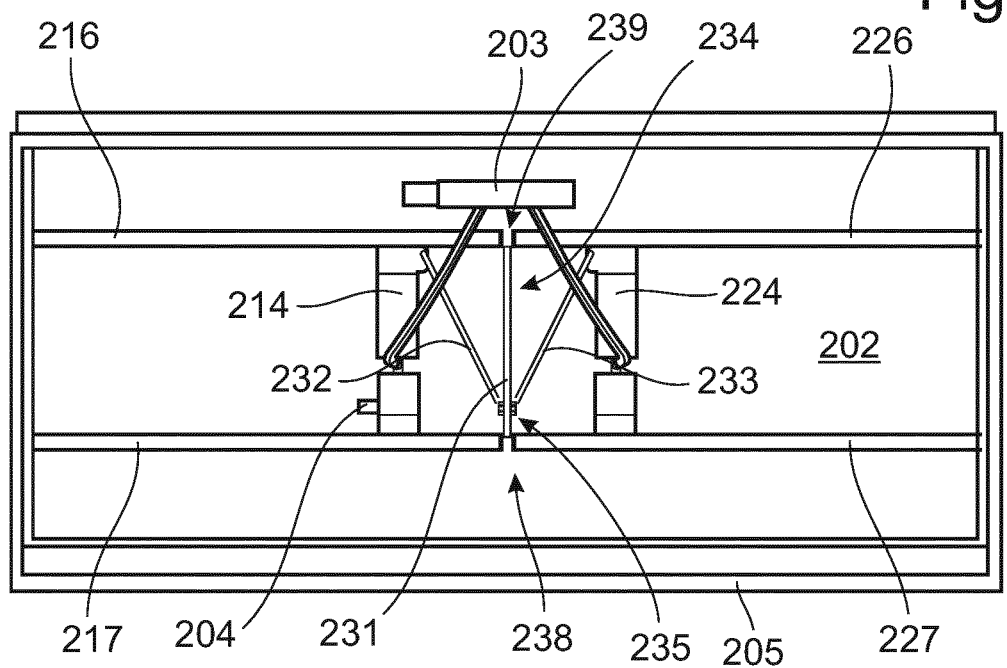
FIG. 8 shows the hatch operating mechanism of FIG. 6 in an intermediate position.
Figure 9:
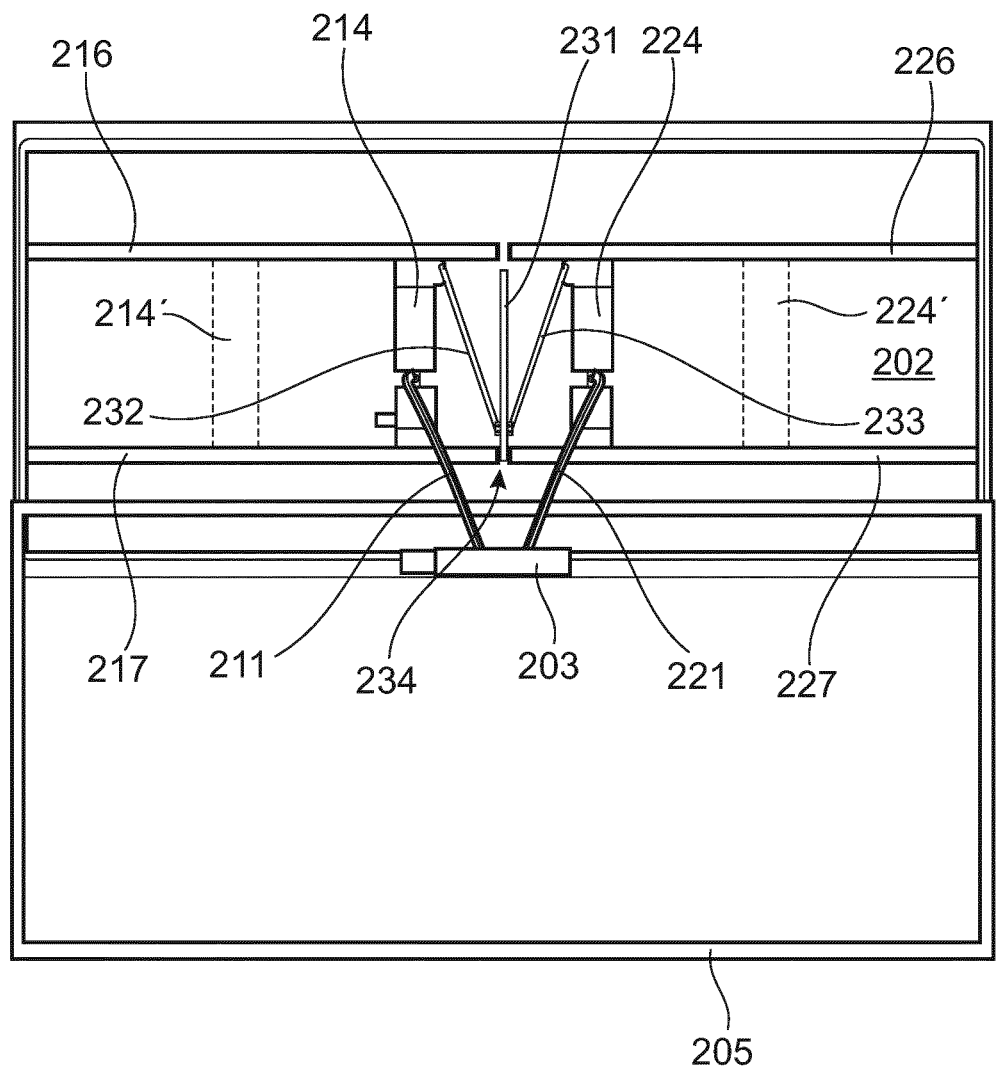
FIG. 9 shows the hatch operating mechanism of FIG. 6 in its final, open position.

FIGS. 7-9 show the operation of the inventive mechanism when moving the hatch from an initial closed position to a final open position via an intermediate position. In these figures, the numbering of FIGS. 2 and 6 will be retained.

FIG. 7 shows the hatch operating mechanism 201 in its initial, closed position, wherein the hatch 202 is held in contact with the opening 205, or frame, mounted in a substantially vertical side surface of the vehicle. The first and the second arm 211, 221 are rotatably attached to the primary drive unit 203 mounted within a compartment in the vehicle (not shown). Each arm 211, 221 is rotatably attached to a respective first and second connecting element 214, 224, which connecting elements are slidable relative a pair of opposed and parallel guide means 216, 217; 226, 227. This arrangement allows the first and second connecting elements 214, 224 to be displaced relative to each other along the guide means 216, 217; 226, 227 during opening and closing of the hatch under the action of the first and second arms 215, 225. In FIG. 7 the first and second connecting elements 214, 224 are located adjacent each other in an initial position. The first and second connecting elements 214, 224 are connected by a stabilizing device 230 comprising an elongate central rod 231 arranged between and parallel with the connecting elements 214, 224 of the hatch operating mechanism 201. A pair of struts 232, are arranged to extend from a first end of the central rod 231 located adjacent one end of the connecting elements 214, 224 to the respective opposite ends of each connecting element 214, 224 adjacent the second end of the central rod 231. In the initial position, the first end 234 of the central rod 231 is arranged to cooperate with the first stabilizing guide 238 intersecting a central position of a pair of adjacent lower guide means 217; 227. In the closed position, the hatch 202 is held in contact with the frame by means of the first and the second arm 211, 221, in order to prevent vertical and outwards movement. The cooperating central rod 231 and the first stabilizing guide 238 assist in preventing sideways, or lateral movement of the hatch 202. The hatch and the frame surrounding the opening can also be provided with cooperating or mating surfaces to prevent relative movement and/or for sealing purposes.

FIG. 8 shows the hatch operating mechanism 201 in an intermediate position. Actuation of the primary drive unit 203 will initiate rotation of the first and second arms 211, 221, wherein the angled arrangement of the driven first shafts (see FIG. 3; "241, 242") of the respective first arm will cause the hatch 202 to be displaced outwards, away from the opening 205. Rotation of the first and second arms 211, 221 causes the first and second connecting elements 214, 224 to be displaced away from each other along the guide means 216, 217; 226, 227 during the initial opening of the hatch.

In order to allow the hatch 202 to be opened sideways, the primary drive unit 203 is first operated to rotate the first and second arms 211, 221 over an initial, predetermined distance sufficient to move the hatch 202 away from the side of the vehicle and clear of the opening covered by the hatch. The primary drive unit 203 is stopped when the central rod 231 is located in the intermediate position shown in FIG. 8. In the intermediate position the ends of the central rod 231 out of contact with both the first and the second stabilizing guides 238, 239 intersecting the guide means 216, 217; 226, 227. In order to displace the hatch 202 parallel to the guide means 216, 217; 226, 227 the secondary drive unit 204 is operated. In the example shown in FIG. 8, the secondary drive unit 204 is mounted on the first connecting element 214 and acts on an adjacent guide means 217 by means of a suitable drive mechanism to displace the hatch 202 in a desired lateral direction. In this example, the hatch can be displaced laterally until one of the connecting elements reaches the end of its corresponding guide means. The hatch can therefore only be partially opened in the lateral direction, as indicated in FIG. 1. This is an advantage if luggage is loaded into the compartment in accordance with a particular destination, so that only a limited portion of the compartment need be exposed in adverse weather conditions. The feature can also be used for preventing access to some parts of the compartment during loading or unloading.

FIG. 9 shows the hatch operating mechanism 201 in its final, open position, wherein the hatch 202 is fully open. Continued rotation of the first and second arms 211, 221 from the intermediate position in FIG. 8 is arranged to continue the primary displacement of the connecting elements 214, 224 away from each other along the guide means 216, 217; 226, 227 towards a second position 214', 224' (shown in dashed lines). In this second position, the arms 211, 221 have been rotated halfway through an arc delimited by the initial position (see FIG. 7) and the final position shown in FIG. 9. Continued rotation of the first and second arms 211, 221 causes a subsequent secondary displacement of the connecting elements 214, 224 from their respective second positions back to their respective first positions, in order to move the hatch 202 to its fully open position. In this way the connecting elements perform a reciprocating movement along the guide means 216, 226; 217, 227 as the first and second arms 211, 221 are rotated through the arc delimited by the initial position and the final position. In order to close the hatch, the first and the second arm are simultaneously rotated in the reverse directions, from the final position to the initial position.

Figure 10:
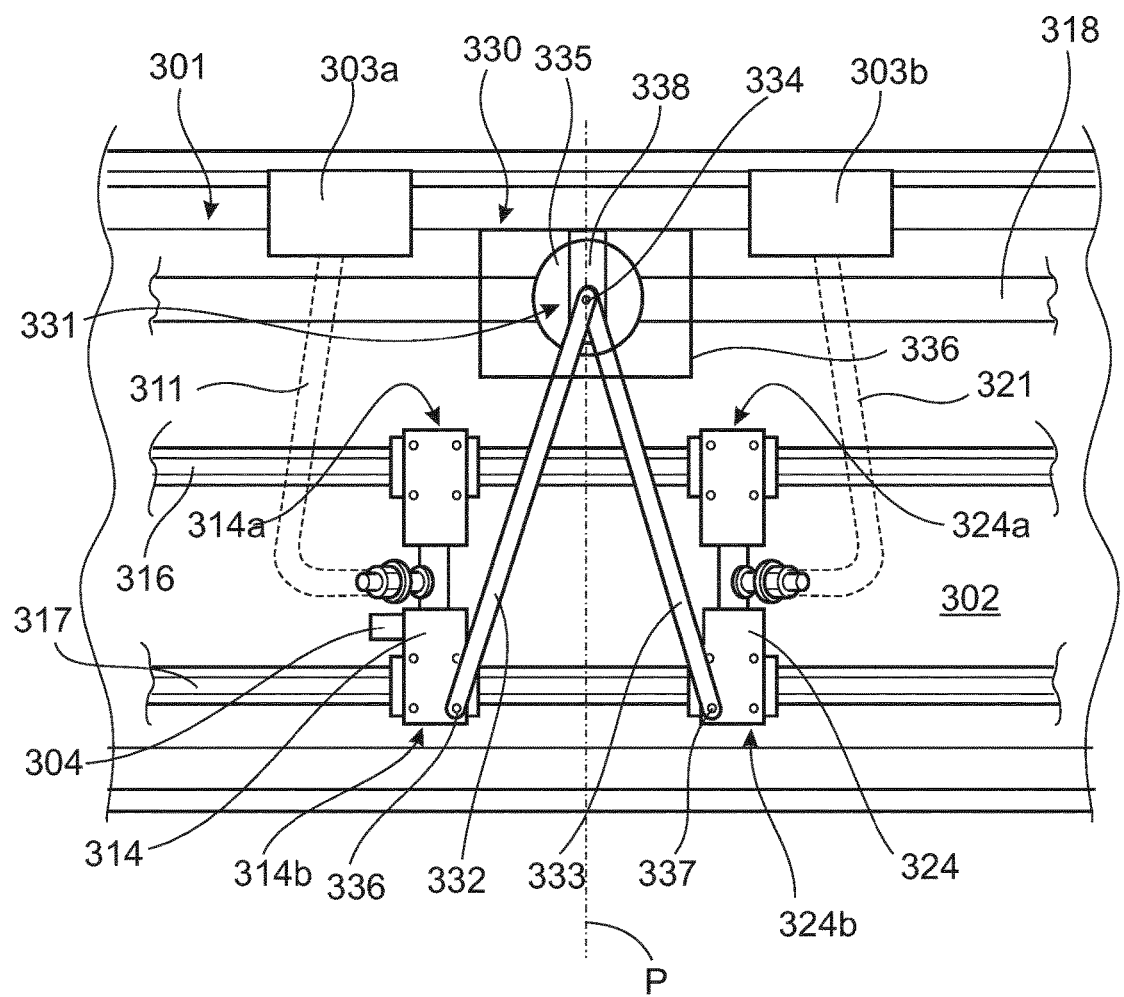
FIG. 10 shows a second embodiment of a hatch operating mechanism according to the invention.

FIG. 10 shows a hatch operating mechanism 301 according to the invention provided with a third alternative stabilizing device 330. A hatch 302 is provided with a hatch operating mechanism 301 comprising a pair of primary drive units 303a, 303b, which hatch is arranged to be opened by means of the primary drive units 303a, 303b and a pair of first and second arms 311, 321. The function and arrangement of the first and second arms 311, 321 is substantially the same as outlined in FIGS. 2-4 above, with the difference that two spaced apart primary drive units 303a, 303b are used instead of a single primary drive unit. Optionally, the arrangement in FIG. 10 can of course also be operated with a single primary drive unit.

According to the third alternative example, the hatch operating mechanism 301 is provided with a stabilizing arrangement 330 comprising a mechanical locking device arranged to selectively prevent sideways displacement of the hatch 302 during the opening and closing operation. The stabilizing device 330 comprises a central sliding member 331 arranged to move between and parallel with the connecting elements 314, adjacent a pair of first ends 314a, 324a of the connecting elements 314, 324 during actuation of the hatch 302. A pair of struts 332, 333 are arranged to extend from a common pivot 334 on the central sliding member 331 adjacent and equidistant from the first ends 314a, 324a of the connecting elements 314, 324 to pivots 336, 337 on a respective second end 314b, 324b of each connecting element 314, 324. The central sliding member 331 is arranged to cooperate with a central guide or slot 338 in a rotatable member 335 in the stabilizing member 330. The rotatable member 335 and the central guide 338 are arranged to act as said locking device. The central guide 338 in the rotatable member 335 is initially located in a first position with an axis intersecting a central position of two parallel first and second guide means 316, 317 in the plane of symmetry through the hatch. The function of the first and second guide means has been described in connection with e.g. FIG. 2 above (see ref.no. "216, 217"). During operation of the hatch 302 the primary drive units 303a, 303b rotates a first and a second arm 311, 321 (indicated in dashed lines) connected to the connecting elements 314, 324. The connecting elements 314, 324 will perform a reciprocating movement along the guide means 316, 317 as the first and second arms 311, 321 are rotated through and arc delimited by their initial and the final positions. The reciprocating displacement of the connecting elements 314, 324 causes the struts 332, 333 to act on the central sliding member 331, which will perform a corresponding reciprocating movement along the central guide 338 at right angles to the first and second guide means 316, 317. As the locking means is mounted on the hatch the central sliding member 331 can only move along the axis of the central guide 338 while the hatch 302 is displaced by the first and the second arm 311, 321. This prevents the hatch 302 in this example from moving in a sideways direction while opening or closing the hatch using the primary drive units 303a, 303b.

The central guide 338 and the rotatable member 335 are rotatable 90° from the first position to a second position about an axis at right angles to the plane of the hatch 302, in order to release the mechanical locking device. In the second position the axis of the central guide 338 is parallel to the first and second guide means 316, 317 attached to the hatch. Rotation of the central guide 338 is possible when the common pivot 334 of the central sliding member 331 is located coinciding with the axis of rotation the rotatable member 335 comprising the central guide 338. The axis of rotation of the rotatable member 335 comprising the central guide 338 coincides with the common pivot 334 on the central sliding member 331 when the hatch operating mechanism has been operated over an initial, predetermined distance sufficient to move the hatch clear of the opening. The hatch operating mechanism is stopped in this intermediate position, in order to allow release of the mechanical locking device and displacement of the hatch 302 parallel to the guide means 316, 317. In the second position, the central guide 338 is indexed with an additional guide means 318 extending parallel to the first and second guide means 316, along the hatch.

The rotatable member 335 in this example is mounted to be rotated relative to a holder fixed to the hatch 302. The holder 336 has slots which are indexed with either end of the central guide 338 of the rotatable member 335, which is shown in its locking position in FIG. 10. The holder 336 has additional slots which are indexed with either end of the central guide 338 and the additional guide means 318 when the rotatable member 335 has been rotated 90° from its first, locking position to its second, released position to allow sideways displacement. The parallel first, second and additional guide means 316, 317, will then allow the hatch to slide sideways relative to central sliding member 331, while the connecting elements 314, 324 held in position by the primary drive units 303a, 303b and the first and the second arm 311, 321. This allows the hatch 302 to be opened sideways in either direction over a limited distance, until one connecting element reaches the end of the guide means.

Subsequently, the hatch 302 is returned to the intermediate position, wherein the common pivot 334 of the central sliding member 331 coincides with the axis of rotation of the rotatable member 335 comprising the central guide 338. The central guide 338 is then rotated 90° from the second position to the first position to secure the mechanical locking device and prevent sideways movement of the hatch. The primary drive units 303a, 303b can then be operated to actuate the first and the second arm 211, 321 in order to displace the hatch 302 towards its open or closed position.

The hatch operating mechanism in this example can be provided with an optional secondary drive unit 304. The secondary drive unit 304 can be arranged on at least one end of a connecting element 314 and is drivingly connected to an adjacent guide means 317. The sideways displacement of the hatch can then be controlled by switches adjacent the hatch, by means of a handheld remote, or from a remote location within the vehicle.

FIGS. 11-14 show the operation of the inventive mechanism when moving the hatch from an initial closed position to a final open position via an intermediate position. In these figures, the numbering of FIG. 10 will be retained.

Figure 11:
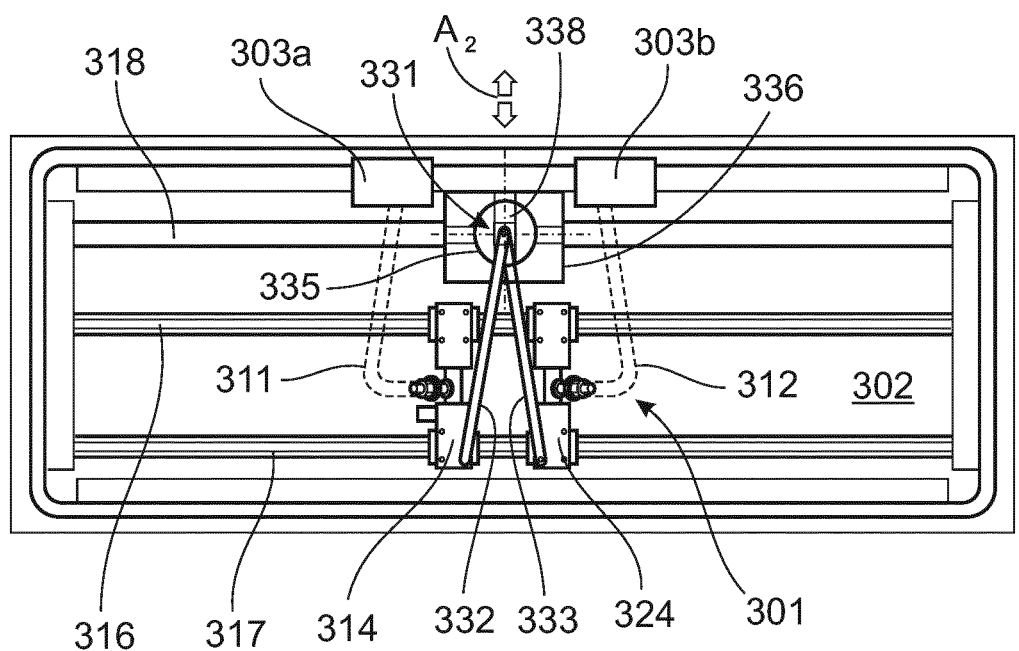
FIG. 11 shows the hatch operating mechanism of FIG. 10 in its initial, closed position.

FIG. 11 shows the hatch operating mechanism 301 in its initial, closed position, wherein the hatch 302 is held in contact with the opening 305, or frame, mounted in a substantially vertical side surface of the vehicle. The first and the second arm 311, 312 (indicated in dashed lines) are rotatably attached to their respective primary drive unit 303a, 303b mounted within a compartment in the vehicle (not shown). Each arm 311, 312 is rotatably attached to a respective first and second connecting element 314, 324, which connecting elements are slidable relative a pair of opposed and parallel guide means 316, 317. This arrangement allows the first and second connecting elements 314, 324 to be displaced relative to each other along the guide means 316, 317 during opening and closing of the hatch under the action of the first and second arms 315, 325. In FIG. 11 the first and second connecting elements 314, 324 are located adjacent each other in an initial position. The first and second connecting elements 314, 324 are connected by a stabilizing device 330 comprising a central sliding member 331 arranged to move between and parallel with the connecting elements 314, 324 during actuation of the hatch 302. A pair of stabilizing struts 332, 333 are arranged to extend from a common pivot 334 on the central sliding member 331 to pivots 336, 337 on each connecting element 314, (see FIG. 10). The central sliding member 331 is arranged to cooperate with a central guide or slot 338 in a rotatable member 335 in the stabilizing member 330. The rotatable member 335 and the central guide 338 are arranged to act as said locking device. The central guide 338 in the rotatable member 335 is initially located in a first position extending along an axis intersecting a central position of two parallel first and second guide means 316, 317 in the plane of symmetry through the hatch. In its closed position, the hatch 302 is held in contact with the frame 305 by means of the first and the second arm 311, 312, in order to prevent vertical and outwards movement. The central sliding member 331 is arranged in a position remote from, in this case above, the axis of rotation of the rotatable member 335 so that sideways movement of the hatch 302 is prevented. The hatch and the frame surrounding the opening can also be provided with cooperating or mating surfaces to prevent relative movement and/or for sealing purposes.

Figure 12:
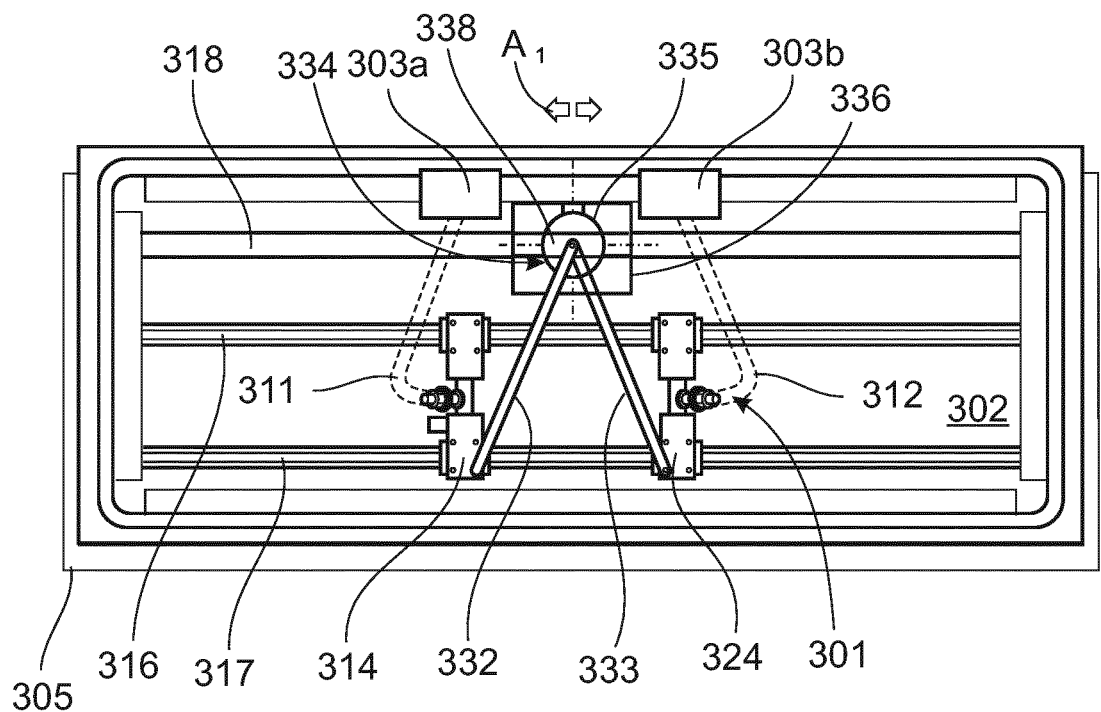
FIG. 12 shows the hatch operating mechanism of FIG. 11 in an intermediate position.

FIG. 12 shows the hatch operating mechanism 301 in an intermediate position. Actuation of the primary drive units 303a, 303b will initiate rotation of the first and second arms 311, 312, wherein the angled arrangement of the driven first shafts of the respective first arm will cause the hatch 302 to be displaced outwards, away from the opening 305. FIG. 10 shows an embodiment using separate primary drive units, but the arrangement of the drive shafts and the principle of operation is the same as described for FIG. 3 above. Rotation of the first and second arms 311, 312 causes the first and second connecting elements 314, 324 to be displaced away from each other along the guide means 316, 317 during the initial opening of the hatch. In order to allow the hatch 302 to be opened sideways, the primary drive units 303a, 303b are first operated to rotate the first and second arms 311, 312 over an initial, predetermined distance sufficient to move the hatch 302 away from the side of the vehicle and clear of the opening covered by the hatch and towards the intermediate position. The primary drive units 303a, 303b are stopped when the common pivot on the central sliding member 331 is arranged in a position coinciding with the axis of rotation of the rotatable member 335. The central guide and the rotatable member 335 can then be rotated 90° from its first, locking position to its second, released position. In this position the central guide 338 is indexed with the additional guide means 318. The parallel first, second and additional guide means 316, 317, 318 will then allow the hatch to slide sideways relative to the central sliding member and the connecting elements 314, 324 held in position by the primary drive units 303a, 303b and the first and the second arm 311, 312.

In order to displace the hatch 302 parallel to the guide means 316, 317, 318 a secondary drive unit 304 as indicated in FIG. 10 can be operated. In the example shown in FIG. 10, the secondary drive unit 304 is mounted on the first connecting element 314 and acts on an adjacent guide means 317 by means of a suitable drive mechanism to displace the hatch 302 in a desired lateral direction. In this example, the hatch can be displaced laterally until one of the connecting elements reaches the end of its corresponding guide means. The hatch can therefore only be partially opened in the lateral direction, as indicated in FIG. 1. This is an advantage if luggage is loaded into the compartment in accordance with a particular destination, so that only a limited portion of the compartment need be exposed in adverse weather conditions. The feature can also be used for preventing access to some parts of the compartment during loading or unloading.

Figure 13:
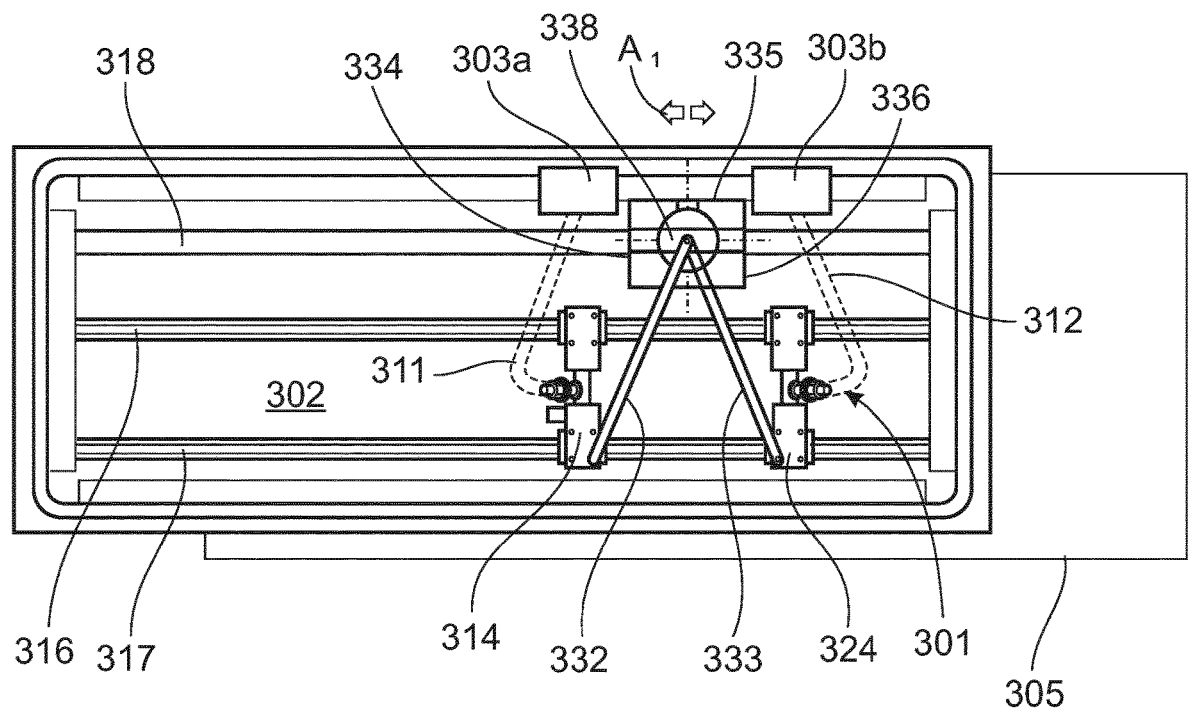
FIG. 13 shows the hatch operating mechanism of FIG. 12 opened sideways.

FIG. 13 shows the hatch operating mechanism 301 displaced from the intermediate position shown in FIG. 12, wherein the hatch 302 is opened sideways. The connecting elements 314, 324 and the stabilizing struts 332, 333 with their central sliding member are held in position by the fixed primary drive units 303a, 303b. As the hatch 302 is displaced into the position shown in FIG. 13, the two parallel first and second guide means 316, 317 will slide relative to the connecting elements 314 and the additional guide means 318 will slide relative to the central sliding member 331 in the central guide 338 in the indexed rotatable member 335.

Figure 14:
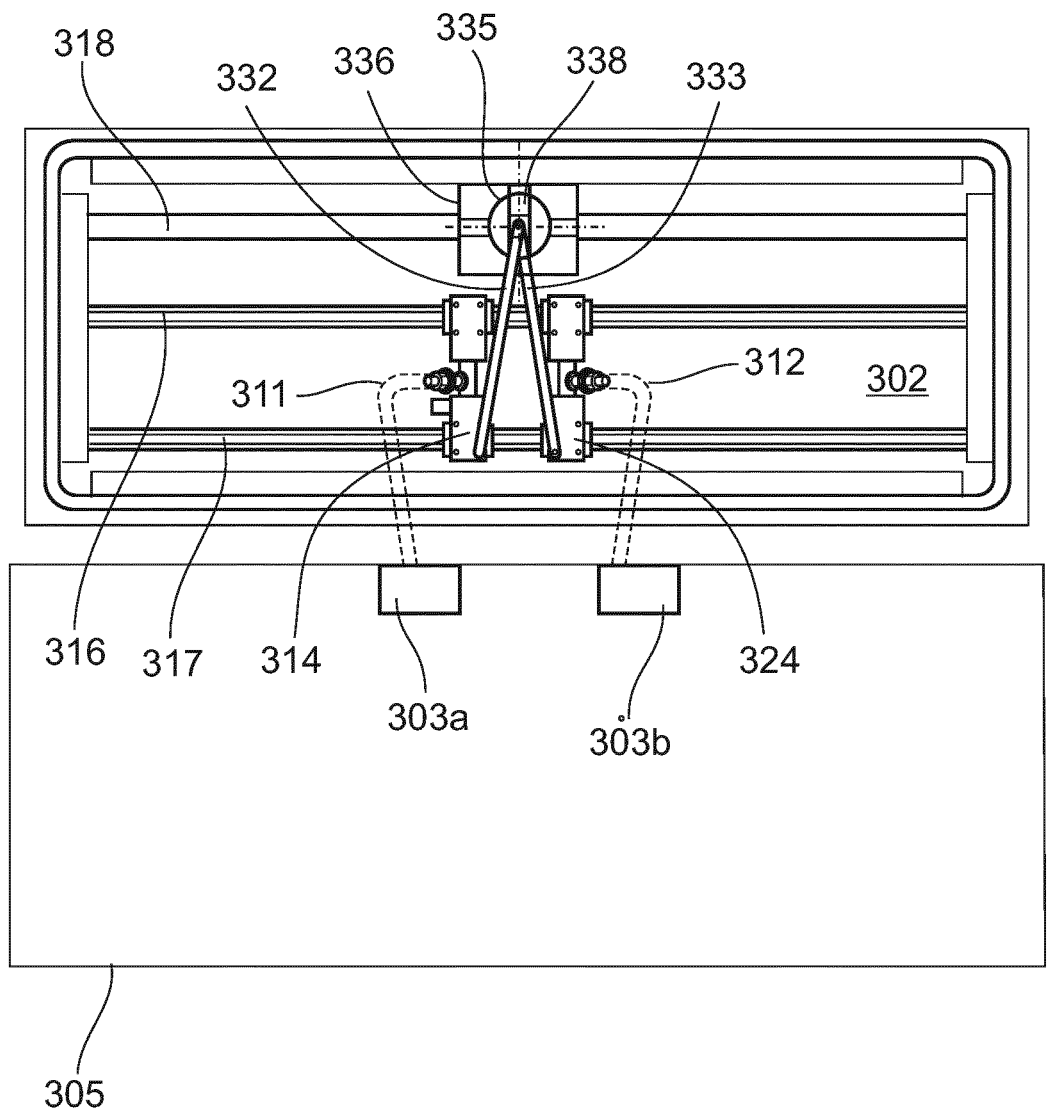
FIG. 14 shows the hatch operating mechanism of FIG. 11 in its final, open position.

FIG. 14 shows the hatch operating mechanism 301 in its final, open position, wherein the hatch 302 is fully open. Continued rotation of the first and second arms 311, 312 from the intermediate position in FIG. 12 is arranged to continue the primary displacement of the connecting elements 314, 324 away from each other along the guide means 316, 317 towards a second position 314', 324' (shown in dashed lines). In this second position, the arms 311, 312 have been rotated halfway through an arc delimited by the initial position (see FIG. 11) and the final position shown in FIG. 13. Continued rotation of the first and second arms 311, 312 causes a subsequent secondary displacement of the connecting elements 314, 324 from their respective second positions back to their respective first positions, in order to move the hatch 302 to its fully open position. In this way the connecting elements perform a reciprocating movement along the guide means 316, 317 as the first and second arms 311, 312 are rotated through the arc delimited by the initial position and the final position. In order to close the hatch, the first and the second arm are simultaneous rotated in the reverse directions, from the final position to the initial position.

Figure 15:
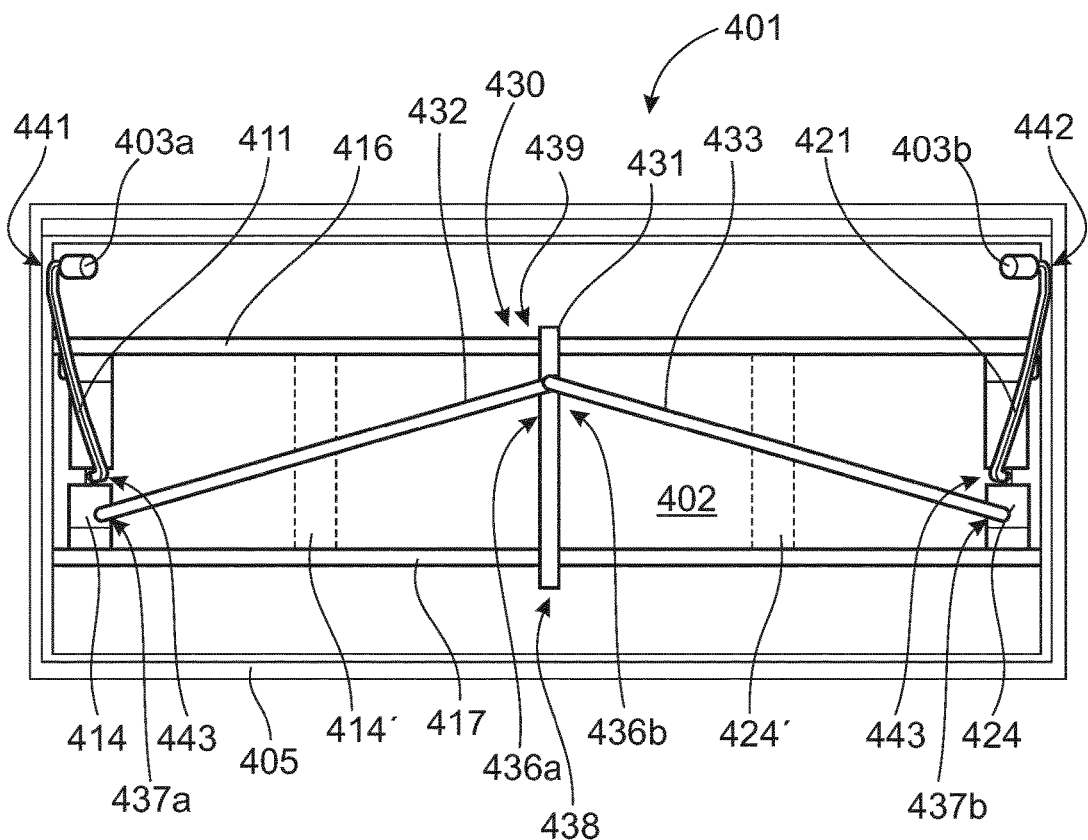
FIG. 15 shows a second embodiment of a hatch operating mechanism according to the invention.

FIG. 15 shows a hatch operating mechanism 401 according to a further embodiment of the invention. A hatch 402 is provided with a hatch operating mechanism 401 comprising a pair of primary drive units 403a, 403b, which hatch is arranged to be opened by means of the primary drive units 403a, 403b and a pair of first and second arms 411, 421. The function and arrangement of the first and second arms 411, 421 is substantially the same as outlined in FIGS. 2-4 above, with the difference that two spaced apart primary drive units 403a, 403b are used instead of a single primary drive unit. Actuation of the primary drive units 403a, 403b will initiate rotation of the first and second arms 411, 421, wherein the angled arrangement of the driven first shafts of the respective first arm will cause the hatch 402 to be displaced outwards, away from the opening 405. FIG. 14 shows an embodiment using separate primary drive units, but the arrangement of the drive shafts and the principle of operation is the same as described for FIG. 3 above. Rotation of the first and second arms 411, 421 causes a primary displacement of the first and second connecting elements 414, 424 towards each other along the guide means 416, 417 during the initial opening of the hatch. Continued rotation of the first and second arms 411, 421 will displace the connecting elements 414, 424 towards a second position 414', 424' (shown in dashed lines). In this second position, the arms 411, 421 have been rotated halfway through an arc delimited by an initial, closed position and a final, open position. Continued rotation of the first and second arms 411, 421 from the second position causes a subsequent secondary displacement of the connecting elements 414, 424 towards each other from their respective second positions back to their respective first positions, in order to move the hatch 402 to its fully open position. In this way the connecting elements perform a reciprocating movement along the guide means 416, 426 as the first and second arms 411, 421 are rotated through the arc delimited by the initial position and the final position. In order to close the hatch, the first and the second arm are simultaneous rotated in the reverse directions, from the final position to the initial position.

FIG. 15 further shows a hatch provided with a stabilizing device 430. The stabilizing device 430 comprises an elongate central rod 431 arranged between and parallel with the connecting elements 414, 424 of the hatch operating mechanism 401. A pair of struts 432, 433 are arranged to extend from the central rod 431 located between one end of the connecting elements 414, 424 to the respective opposite ends of each connecting element 414, 424. The struts 432, 433 are pivotable in a plane parallel to a plane through the parallel guide means 416, 417. A pair of first pivot joints 436a, 436b allows the struts 432, 433 to be pivoted relative to the central rod 431. A pair of second pivot joints 437a, 437b allows the struts 432, 433 to be pivoted relative to their respective connecting element 414, 424. The central rod 431 is arranged to cooperate with first and second stabilizing guides 438, 439 intersecting a central position of each guide means 416, 417. During rotation of the first and second arms 411, 421 the central rod 431 is arranged to be displaced along its central axis in the plane of symmetry. The first end of the central rod is arranged to cooperate with at least the first guide 438 when the hatch 402 is in its closed position and its fully open position, i.e. whenever the first and second arms 411, are in their end positions. The second end of the central rod 431 is arranged to cooperate with the second guide 439 when the hatch 402 is between its closed position and its fully open position. In this way, the stabilizing central rod 431 will move linearly in at least one the first stabilizing guide 438 and the second stabilizing guide 439 during operation of the primary drive units 403a, 403b to open or close the hatch 402.

Figure 16:
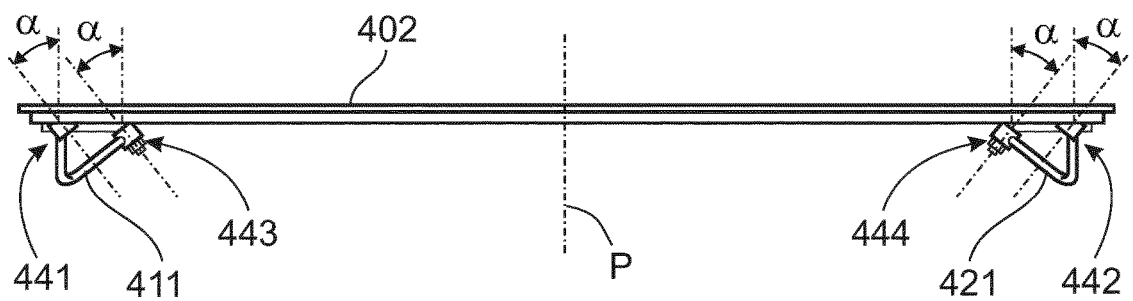
FIG. 16 shows a plan view of a hatch and attached first and the second arm in FIG. 14.

FIG. 16 shows a plan view of a hatch 402 and attached first and second arms 411, 421 from FIG. 14. The figure shows the first shafts 441, 442 at the first ends of the first and second arms 411, 421, which first shafts 441, 442 have axes arranged at equal and opposite angles α from the plane of symmetry P. Similarly, the respective axes of the second shafts 443, 444 at the second ends of the first and second arms 411, 421 are arranged at equal and opposite angles α from the plane of symmetry P.

It is to be understood that the present invention is not limited to the embodiments described above and illustrated in the drawings; rather, the skilled person will recognize that many changes and modifications may be made within the scope of the appended claims.

The invention claimed is:

1. A hatch operating mechanism arranged to control opening and closing movements of a hatch for covering an opening in a vehicle, comprising:
   a first arm and a second arm, each rotatably attached to the vehicle at a first end thereof and rotatably attached to the hatch at a second end thereof; and
   a first connecting element and a second connecting element, each extending between and displaceable relative to a pair of spaced apart, parallel guides fixed to the hatch, the pair of spaced apart, parallel guides comprising an upper guide and a lower guide, with the upper guide either being continuous or having two linearly arranged discontinuous upper guide portions, and the lower guide either being continuous or having two linearly arranged discontinuous lower guide portions, wherein the second ends of the first and second arms are rotatably attached, respectively, to the first connecting element and the second connecting element;
   wherein the first arm and the second arm are in mirrored positions relative to a plane of symmetry located at right angles relative to longitudinal axes of the guides;
   b wherein each of the first arm and the second arm comprises a shaft at the first end b thereof, the shafts being in a common plane, with the shafts having axes at equal and opposite angles relative to the plane of symmetry;
   wherein the first arm is configured to rotate in a first direction over a first arcuate path about the shaft of the first arm, and the second arm is configured to simultaneously rotate in an opposing second direction over a second arcuate path about the shaft of the second arm; and
   wherein the first connecting element and the second connecting element are configured to move in a reciprocating manner along the guides during rotation of the first arm and the second arm.

2. The hatch operating mechanism of claim 1, further comprising:
   a stabilizing device comprising a central rod between and parallel with the first and second connecting elements, the central rod comprising a first end and a second end, and
   a pair of struts extending from the first end of the central rod, with one strut of the pair of struts connecting to the first connecting element adjacent the second end of the central rod, and with the other strut of the pair of struts connecting to the second connecting element adjacent the second end of the central rod.

3. The hatch operating mechanism of claim 2, wherein, when the upper and lower parallel guides each comprises the discontinous guide portions, the central rod is arranged to cooperate with stabilizing guides, the stabilizing guides located along a central position of the pair of spaced apart, parallel guides.

4. The hatch operating mechanism of claim 3, wherein the first end of the central rod is configured to cooperate with a first stabilizing guide of the stabilizing guides when the hatch is in a closed position and a fully open position.

5. The hatch operating mechanism of claim 4, wherein the second end of the central rod is arranged to cooperate with a second stabilizing guide of the stabilizing guides when the hatch is between the closed position and the fully open position.

6. The hatch operating mechanism of claim 5, wherein the central rod is arranged to be located in an intermediate position out of contact with the first and second stabilizing guides to allow displacement of the hatch parallel to the pair of spaced apart, parallel guides.

7. The hatch operating mechanism of claim 1, further comprising:
   a stabilizing device comprising a central sliding member, and
   a pair of struts extending from a common pivot of the central sliding member, with one strut of the pair of struts extending to an end of the first connecting element, and with the other strut of the pair of struts extending to an end of the second connecting element.

8. The hatch operating mechanism of claim 7, wherein the central sliding member is arranged to cooperate with a central guide having an axis intersecting each guide of the pair of spaced apart, parallel guides.

9. The hatch operating mechanism of claim 8, wherein the central guide is configured to prevent sideways displacement of the hatch when the hatch is in a closed position and a fully open position.

10. The hatch operating mechanism of claim 9, wherein the central guide comprises a rotatable member that is configured to be rotatable 900 about an axis of rotation at a right angle to the hatch when the common pivot of the central sliding member is located b coinciding with the axis of rotation to allow sideways displacement of the hatch.

11. The hatch operating mechanism of claim 1, further comprising at least one primary drive unit configured to be drivingly connected to the first ends of the first and second arms.

12. The hatch operating mechanism of claim 11, wherein the at least one primary drive unit is configured to simultaneously rotate the first end of the first arm in the first direction over the first arcuate path, and rotate the first end of the second arm in the opposing second direction over the second arcuate path.

13. The hatch operating mechanism of claim 11, wherein a secondary drive unit is arranged on at least one end of one or more of the first connecting element and the second connecting element and is drivingly connected to a guide of the pair of spaced apart, parallel guides for displacement of the hatch parallel to the guides.

14. The hatch operating mechanism of claim 11, wherein the at least one primary drive unit is connected to the vehicle adjacent a central portion of the opening and is drivingly connected to the first end of the first arm and the first end of the second arm via a transmission mechanism for simultaneous rotation of the first end of the first arm in the first direction over the first arcuate path, and rotation of the first end of the second arm in the opposing second direction over the second arcuate path.

15. The hatch operating mechanism of claim 1, wherein first and second primary drive units are connected to the vehicle along opposing sides of the opening, with a predetermined spacing therebetween, with the first primary drive unit drivingly connected directly or via a transmission mechanism to the first end of the first arm, and with the second primary drive unit driving connected directly or via a transmission mechanism to the second arm, for simultaneous rotation of the first arm in the first direction and rotation of the second arm in the opposing second direction.

16. The hatch operating mechanism of claim 1, wherein at least one of the upper guide and the lower guide is continuous.

17. The hatch operating mechanism of claim 1, wherein at least one of the upper guide has the two linearly arranged discontinuous upper guide portions, and the lower guide has the two linearly arranged discontinuous lower guide portions.

\* \* \* \* \*